US012598007B2

(12) United States Patent
Jung et al.

(10) Patent No.: US 12,598,007 B2
(45) Date of Patent: Apr. 7, 2026

(54) METHOD AND DEVICE FOR PERFORMING MDT LOGGING IN CASE OF IDC PROBLEM IN WIRELESS COMMUNICATION SYSTEM

(71) Applicant: Samsung Electronics Co., Ltd., Suwon-si (KR)

(72) Inventors: Sangyeob Jung, Suwon-si (KR); Himke Van Der Velde, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 18/256,195

(22) PCT Filed: Dec. 15, 2021

(86) PCT No.: PCT/KR2021/019089
§ 371 (c)(1),
(2) Date: Jun. 6, 2023

(87) PCT Pub. No.: WO2022/139307
PCT Pub. Date: Jun. 30, 2022

(65) Prior Publication Data
US 2024/0031041 A1     Jan. 25, 2024

(30) Foreign Application Priority Data

Dec. 24, 2020    (KR) ........................ 10-2020-0183420

(51) Int. Cl.
*H04W 72/00*        (2023.01)
*H04B 17/00*        (2015.01)
(Continued)

(52) U.S. Cl.
CPC ......... *H04B 17/15* (2015.01); *H04B 17/0085* (2013.01); *H04W 76/27* (2018.02)

(58) Field of Classification Search
CPC ... H04B 17/15; H04B 17/0085; H04W 76/27; H04W 24/10
See application file for complete search history.

(56) References Cited

U.S. PATENT DOCUMENTS

| | | | | |
|---|---|---|---|---|
| 2014/0056273 A1* | 2/2014 | Jang | ...................... | H04L 1/0026 |
| | | | | 370/329 |
| 2015/0373507 A1* | 12/2015 | Jung | ...................... | H04W 24/08 |
| | | | | 370/235 |

(Continued)

FOREIGN PATENT DOCUMENTS

| | | |
|---|---|---|
| KR | 10-2014-0103545 A | 8/2014 |
| KR | 10-2021-0055409 A | 5/2021 |

OTHER PUBLICATIONS

International Search Report and Written Opinion of the International Searching Authority dated Mar. 22, 2022, in connection with International Application No. PCT/KR2021/019089, 12 pages.

(Continued)

*Primary Examiner* — Lan-Huong Truong

(57) ABSTRACT

The present disclosure relates to a method performed by a user equipment (UE) in a wireless communication system. The method may include receiving, from a base station (BS), configuration information associated with a logged minimization of driving test (MDT), and performing measurement logging in a plurality of logging intervals, based on the configuration information when the UE transitions to an idle state or an inactive state. The performing of the measurement logging may include, when reportType is set to event-Triggered, detecting whether an in-device coexistence (IDC) problem has occurred in a last logging interval from among the plurality of logging intervals while the measurement logging is performed, and when it is detected that the IDC problem has occurred, logging a flag indicating the occurrence of the IDC problem.

12 Claims, 20 Drawing Sheets

(51) Int. Cl.
    *H04B 17/15*          (2015.01)
    *H04W 76/27*          (2018.01)

(56)                    References Cited

U.S. PATENT DOCUMENTS

2016/0242076 A1      8/2016  Lee et al.
2019/0306740 A1 *  10/2019  Kim ..................... H04W 24/10
2021/0153207 A1 *   5/2021  Bhamri ................ H04L 5/0082

OTHER PUBLICATIONS

Ericsson, "Leftover issues for Logged MDT in Nr," R2-1915755, 3GPP TSG-RAN WG2 Meeting #108, Reno, US, Nov. 18-22, 2019, 22 pages.
Nokia, et al., "Enhancements for Logged MDT and RLF reporting," R2-2009434, 3GPP TSG-RAN WG2 Meeting #112 Electronic, Nov. 2-13, 2020, 8 pages.
Samsung, "Procedural specification for suppression logging due to IDC (S.030)," R2-160046, 3GPP TSG-RAN2 ASN.1 Ad Hoc, Helsinki, Finland, Jan. 13-14, 2016, 8 pages.

* cited by examiner

FIG. 1Gb

A periodical 1g-35 measurement logging is suspended?

NO → 1g-50 Perform or resume measurement logging 1g-55 UE detects IDC problems during the last logging interval when adding a logged measurement entry in VarLogMeasReport?

NO → 1g-65 Log available measurements

YES → 1g-60 Include inDeviceCoexDetected and suspend measurement logging from the next logging interval YES → 1g-40 The IDC problems detected by the UE is resolved during the last logging interval?

YES

NO → 1g-45 Keep suspending measurement logging

FIG. 1Hb

C periodical 1h-35 measurement logging is suspended?

NO → 1h-50 Perform or resume measurement logging 1h-55 UE detects IDC problems during the last logging interval when adding a logged measurement entry in VarLogMeasReport?

NO → 1h-65 Log available measurements

YES → 1h-60 Include inDeviceCoexDetected and suspend measurement logging from the next logging interval YES → 1h-40 The IDC problems detected by the UE is resolved during the last logging interval?

NO → 1h-45 Keep suspending measurement logging

FIG. 1Ib periodical (E)

1i-35
measurement logging is suspended?

NO

YES 1i-50
Perform or resume measurement logging 1i-40
The IDC problems detected by the UE is resolved during the last logging interval?

YES

NO 1i-45
Keep suspending measurement logging 1i-55
UE detects IDC problems during the last logging interval when adding a logged measurement entry in VarLogMeasReport?

YES

NO 1i-60
Include inDeviceCoexDetected and suspend measurement logging from the next logging interval 1i-65
Log available measurements

METHOD AND DEVICE FOR PERFORMING MDT LOGGING IN CASE OF IDC PROBLEM IN WIRELESS COMMUNICATION SYSTEM

CROSS-REFERENCE TO RELATED APPLICATIONS

This application is a 371 National Stage of International Application No. PCT/KR2021/019089, filed Dec. 15, 2021, which claims priority to Korean Patent Application No. 10-2020-0183420, filed Dec. 24, 2020, the disclosures of which are herein incorporated by reference in their entirety.

BACKGROUND

1. Field

The present disclosure relates to a method and apparatus for performing minimization of driving test (MDT) logging when an in-device coexistence (IDC) problem occurs in a wireless communication system.

2. Description of Related Art

In order to satisfy increasing demand with respect to wireless data traffic due to the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems.

In order to achieve high data rates, implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied.

In order to improve performance of system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and received-interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied.

In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 5G communication technology and IoT technology.

As described above, due to the development of wireless communication systems, there is a demand for a method and apparatus for performing a minimization of driving test (MDT) logging operation when an in-device coexistence (IDC) problem occurs in a wireless communication system.

SUMMARY

The present disclosure provides a method and apparatus for performing minimization of driving test (MDT) logging when an in-device coexistence (IDC) problem occurs in a wireless communication system.

BRIEF DESCRIPTION OF THE DRAWINGS

FIG. 1Gb is a flowchart of a UE performing measurement logging according to an embodiment of the present disclosure.

FIG. 1Gc is a flowchart of a UE performing measurement logging according to an embodiment of the present disclosure.

FIG. 1Hb is a flowchart of a UE performing measurement logging according to an embodiment of the present disclosure.

FIG. 1Hc is a flowchart of a UE performing measurement logging according to an embodiment of the present disclosure.

FIG. 1Ib is a flowchart of a UE performing measurement logging according to an embodiment of the present disclosure.

FIG. 1Ic is a flowchart of a UE performing measurement logging according to an embodiment of the present disclosure.

FIG. 1Jb is a flowchart of a UE performing measurement logging according to an embodiment of the present disclosure.

FIG. 1Jc is a flowchart of a UE performing measurement logging according to an embodiment of the present disclosure.

DETAILED DESCRIPTION

Figure 1A:
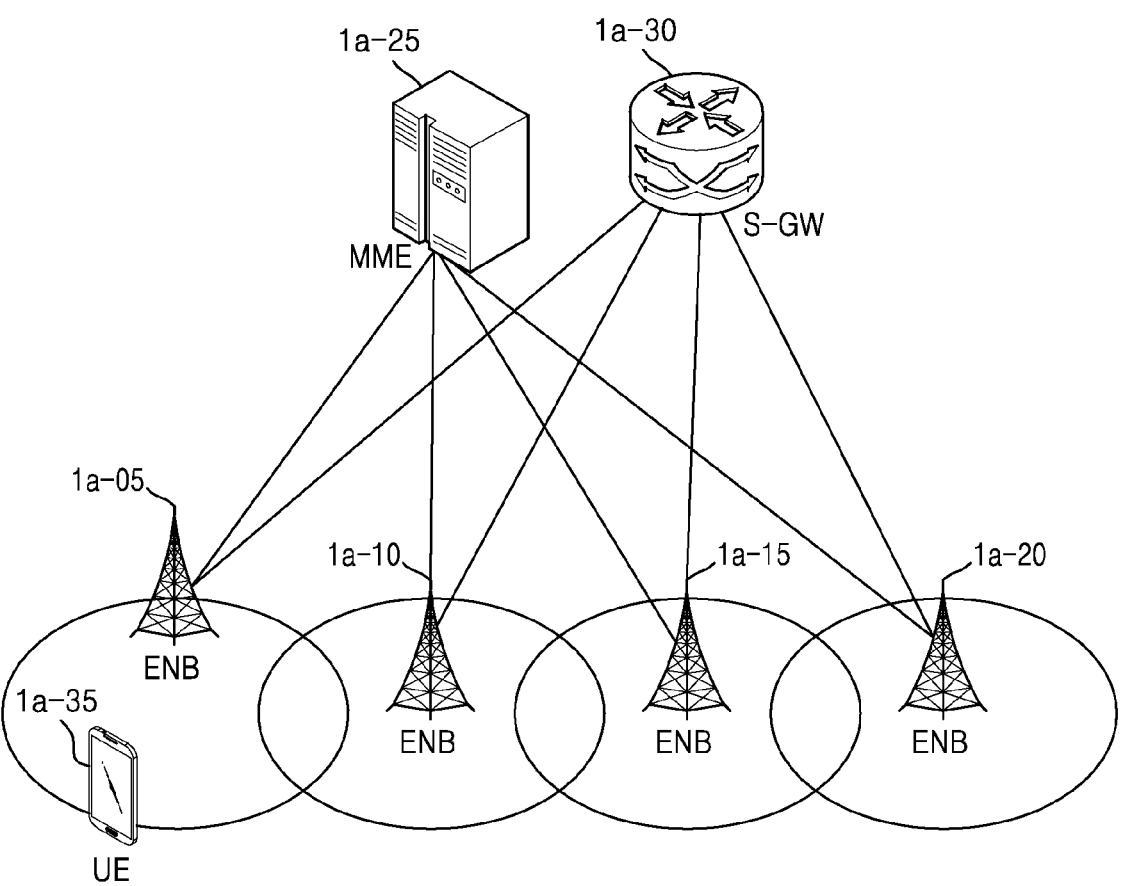
FIG. 1A is a diagram illustrating an architecture of a long term evolution (LTE) system.

According to an embodiment of the present disclosure, an operating method of a terminal in a wireless communication system may include: receiving a LoggedMeasurementConfiguration message in a radio resource control (RRC) connected mode; receiving an RRC connection release message from a base station; logging measurement in an RRC idle mode (RRC_IDLE) or an RRC inactive mode (RRC_INACTIVE); based on the received LoggedMeasurementConfiguration message, logging measurement to include an in-device coexistence (IDC) flag when an IDC problem is detected during a last logging interval; and transmitting the logged measurement to the base station.

According to an embodiment of the present disclosure, a method and apparatus for performing minimization of driving test (MDT) logging when an in-device coexistence (IDC) problem occurs in a wireless communication system may be provided.

Hereinafter, embodiments of the present disclosure will now be described more fully with reference to the accompanying drawings. In the following description of embodiments, descriptions of techniques that are well known in the art and not directly related to the present disclosure are omitted. By omitting unnecessary explanations, the essence of the present disclosure may not be obscured and may be explicitly conveyed.

For the same reason, some elements in the drawings are exaggerated, omitted, or schematically illustrated. Also, the size of each element does not entirely reflect the actual size. In the drawings, the same or corresponding elements are denoted by the same reference numerals.

Advantages and features of the present disclosure and methods of accomplishing the same may be understood more readily by reference to the following detailed descriptions of embodiments and accompanying drawings. However, the present disclosure may be embodied in many different forms and should not be construed as being limited to the embodiments set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals denote like elements.

Here, it will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed by the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block(s). The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in the present embodiment, refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in embodiments.

In the description of the present disclosure, detailed descriptions of the related art are omitted when it is deemed that they may unnecessarily obscure the essence of the present disclosure. Hereinafter, embodiments of the present disclosure will be described in detail with reference to accompanying drawings.

Hereinafter, terms identifying an access node, terms indicating network entities, terms indicating messages, terms indicating an interface between network entities, and terms indicating various pieces of identification information, as used in the following description, are exemplified for convenience of descriptions. Accordingly, the present disclosure is not limited to the terms to be described below, and other terms indicating objects having equal technical meanings may be used.

For convenience of descriptions, in the present disclosure, terms and names or modifications of the terms and names defined in the 3rd Generation Partnership Project Long Term Evolution (3GPP LTE) standard are used. However, the present disclosure is not limited to the terms and names, and may also be applied to systems following other standards. In the present disclosure, an evolved node B (eNB) may be interchangeably used with a next-generation node B (gNB) for convenience of explanation. That is, a base station (BS) described by an eNB may represent a gNB. Also, the term "terminals" may refer to not only mobile phones, narrow-band Internet of Things (NB-IoT) devices, and sensors but also other wireless communication devices.

Hereinafter, a base station is an entity that allocates resources to a terminal, and may be at least one of a gNode B, an eNode B, a Node B, a BS, a radio access unit, a BS controller, or a node on a network. A terminal may include a user equipment (UE), a mobile station (MS), a cellular phone, a smartphone, a computer, or a multimedia system capable of performing a communication function. However, the present disclosure is not limited to the above example.

In particular, the present disclosure may be applied to 3GPP NR (5th generation mobile communication standards). Also, the present disclosure is applicable to intelligent services (e.g., smart home, smart building, smart city, smart car or connected car, health care, digital education, retail, security, and safety services) based on 5G communication technology and Internet of things (IoT) technology. In the present disclosure, an eNB may be interchangeably used with a gNB for convenience of explanation. That is, a BS described by an eNB may represent a gNB. Also, the term "terminals" may refer to not only mobile phones, narrow-band NB-IoT devices, and sensors but also other wireless communication devices.

Wireless communication systems that provided voice-based services in the early stages are now being developed to be broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-Pro of 3GPP, high rate packet data (HRPD), ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL) and employs single carrier-frequency division multiple access (SC-FDMA) for an uplink (UL). The UL refers to a radio link for transmitting data or a control signal from a terminal (e.g., a UE or an MS) to a base station (e.g., an eNB or a BS), and the DL refers to a radio link for transmitting data or a control signal from the base station to the terminal. Although LTE, LTE-A, LTE Pro, or 5G (New Radio (NR)) systems are mentioned as examples in the following description, embodiments of the present disclosure may also be applied to other communication systems having similar technical backgrounds or channel types. Furthermore, embodiments of the present disclosure are applicable to other communication systems through modification at the discretion of one of ordinary skill in the art without greatly departing from the scope of the present disclosure.

FIG. 1A is a diagram illustrating an architecture of a LTE system.

Referring to FIG. 1A, a radio access network (RAN) of the LTE system includes a plurality of eNBs (or nodes B or BSs) 1a-05, 1a-10, 1a-15, and 1a-20, a mobility management entity (MME) 1a-25, and a serving-gateway (S-GW) 1a-30. A UE (or a terminal) 1a-35 accesses an external network via the eNB 1a-05, 1a-10, 1a-15, or 1a-20 and the S-GW 1a-30.

The eNB 1a-05, 1a-10, 1a-15, or 1a-20 is an access node of a cellular network and provides wireless access to UEs accessing the network. That is, in order to service traffic of users, the eNB 1a-05, 1a-10, 1a-15, or 1a-20 collects state information of UEs, the state information including buffer state information, available transmit power state information, and channel state information, performs scheduling, and supports connection between the UEs and a core network (CN).

Also, the eNB 1a-05, 1a-10, 1a-15, or 1a-20 may correspond to a node B of a universal mobile telecommunications system (UMTS). The eNB 1a-05, 1a-10, 1a-15, or 1a-20 may be connected to the UE 1-35 via wireless channels and may perform complex functions, compared to the node B. In the LTE system, all user traffic data including real-time services such as voice over Internet protocol (VoIP) may be serviced via shared channels, and thus, an entity for performing scheduling by collating state information of UEs, the state information including buffer state information, available transmit power state information, and channel state information, may be required and the eNB 1a-05, 1a-10, 1a-15, or 1a-20 may operate as such an entity One eNB may generally control a plurality of cells. For example, the LTE system may use a radio access technology such as orthogonal frequency division multiplexing (OFDM) at a bandwidth of 20 MHz so as to achieve a data rate of 100 Mbps. Also, the LTE system uses adaptive modulation & coding (AMC) to determine a modulation scheme and a channel coding rate in accordance with a channel state of the UE.

The S-GW 1a-30 is an entity for providing data bearers and generates or removes the data bearers according to the control by the MME 1a-25. The MME is an entity for performing a mobility management function and various control functions on the UE and may be connected to the plurality of eNBs. The MME 1a-25 and the S-GW 1a-30 may perform authentication, bearer management, or the like with respect to a UE accessing a network, and processes a packet received from the eNB 1a-05, 1a-10, 1a-15, or 1a-20 or a packet to be transmitted to the eNB 1a-05, 1a-10, 1a-15, or 1a-20.

Figure 1B:
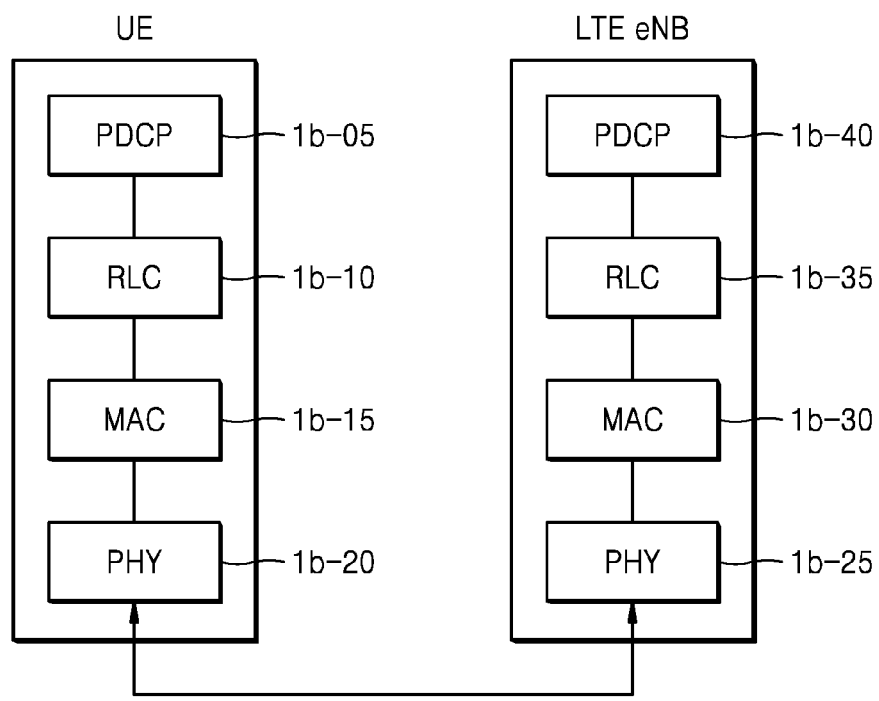
FIG. 1B is a diagram illustrating a radio protocol architecture of an LTE system.

FIG. 1B is a diagram illustrating a radio protocol architecture of an LTE system.

Referring to FIG. 1B, the radio protocol architecture of the LTE system includes packet data convergence protocol (PDCP) layers 1b-05 and 1b-40, radio link control (RLC) layers 1b-10 and 1b-35, media access control (MAC) layers 1b-15 and 1b-30, and physical (PHY) layers 1b-20 and 1b-25 respectively for a UE and a LTE eNB.

The PDCP layer 1b-05 or 1b-40 is in charge of Internet protocol (IP) header compression/decompression. Main functions of the PDCP layer are summarized as shown below.

Header compression and decompression: robust header compression (ROHC) only

Transfer of user data

In-sequence delivery of upper layer packet data units (PDUs) at PDCP re-establishment procedure for RLC acknowledged mode (AM)

For split bearers in dual connectivity (DC) (only support for RLC AM): PDCP PDU routing for transmission and PDCP PDU reordering for reception Duplicate detection of lower layer service data units (SDUs) at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLC layer 1b-10 or 1b-35 performs an automatic repeat request (ARQ) operation by reconfiguring PDCP PDUs to appropriate sizes. Main functions of the RLC layer are summarized as shown below.

Transfer of upper layer PDUs

Error correction through ARQ (only for AM data transfer)

Concatenation, segmentation and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer 1b-15 or 1b-30 may be connected to a plurality of RLC layers configured for one UE, and may multiplex RLC PDUs into a MAC PDU and demultiplex the RLC PDUs from the MAC PDU. Main functions of the MAC layer are summarized as shown below.

Mapping between logical channels and transport channels

Multiplexing/demultiplexing of MAC SDUs belonging to one or different logical channels into/from transport blocks (TBs) delivered to/from the physical layer on transport channels Scheduling information reporting Error correction through hybrid ARQ (HARQ)

Priority handling between logical channels of one UE

Priority handling between UEs by means of dynamic scheduling

Multimedia broadcast/multicast service (MBMS) service identification

Transport format selection

Padding

The PHY layer 1b-20 or 1b-25 channel-codes and modulates upper layer data into OFDM symbols and transmits the OFDM symbols via a wireless channel, or demodulates OFDM symbols received via a wireless channel and channel-decodes and transmits the OFDM symbols to an upper layer.

Although not illustrated in FIG. 1B, RRC layers are present respectively above PDCP layers of the UE and the LTE eNB, and the RRC layers may exchange configuration control messages related to an access and measurement so as to control radio resources.

Figure 1C:
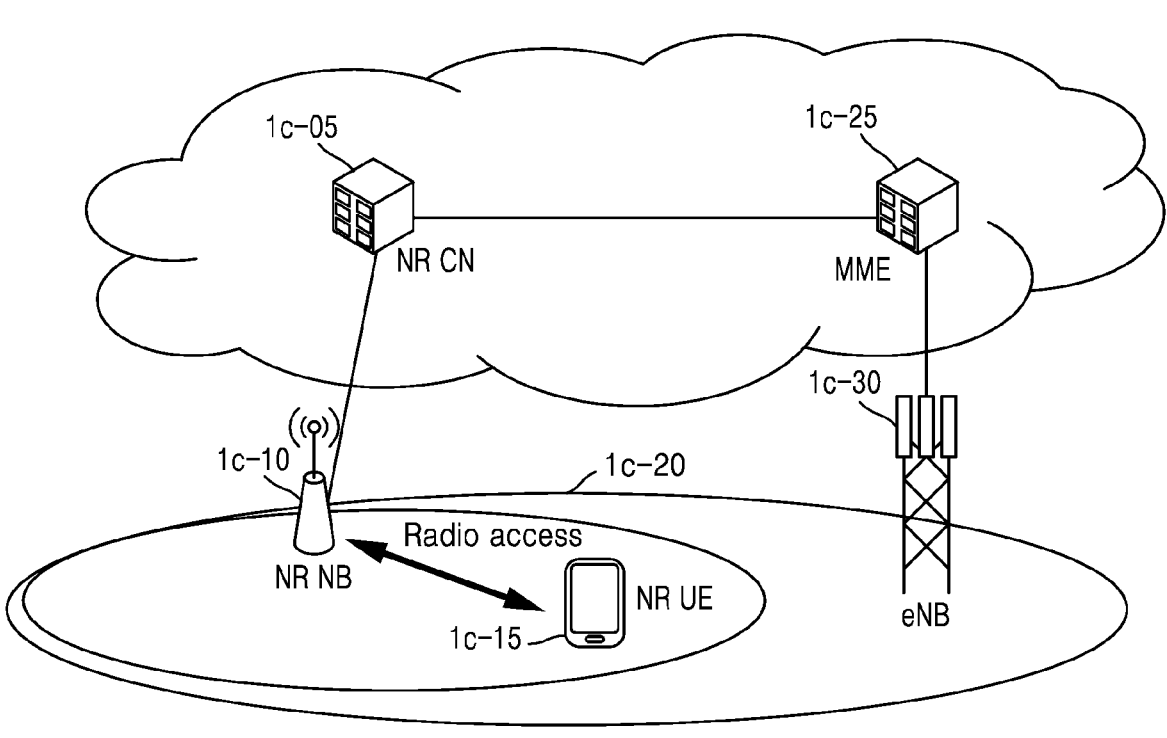
FIG. 1C is a diagram illustrating an architecture of a next-generation mobile communication system.

FIG. 1C is a diagram illustrating an architecture of a next-generation mobile communication system.

Referring to FIG. 1C, as illustrated, a radio access network of the next-generation mobile communication system (e.g., a NR or 5G system) includes a next-generation BS (a new radio node B, e.g., NR gNB or NR BS) 1c-10 and a new radio core network (NR CN) 1c-05. A NR UE (or NR terminal) 1c-15 may access an external network via the NR gNB 1c-10 and the NR CN 1c-05.

In FIG. 1C, the NR gNB 1c-10 may correspond to an eNB of a LTE system. The NR gNB 1c-10 may be connected to the NR UE 1c-15 via wireless channels and may provide superior services compared to a node B. In the next-generation mobile communication system, all user traffic data may be serviced through shared channels, and therefore, an entity for performing scheduling by collating, for example, buffer state information of UEs, available transmit power state information, and channel state information may be required and the NR gNB 1c-10 may operate as such an entity. One NR gNB 1c-10 may control a plurality of cells. The next-generation mobile communication system (e.g., a NR or 5G system) may have a bandwidth greater than the maximum bandwidth of the LTE system so as achieve an ultrahigh data rate, and a beamforming technology may be additionally associated with OFDM as a radio access technology. Also, AMC may also be used to determine a modulation scheme and a channel coding rate in accordance with a channel state of the NR UE. The NR CN 1c-05 performs functions such as mobility support, bearer configuration, quality of service (QoS) configuration, and the like. The NR CN 1c-05 is an entity for performing a mobility management function and various control functions on the NR UE 1c-15 and is connected to a plurality of BSs. Also, the next-generation mobile communication system may cooperate with the LTE system, and the NR CN 1c-05 may be connected to an MME 1c-25 via a network interface. The MME 1c-25 is connected to a legacy eNB 1c-30.

Figure 1D:
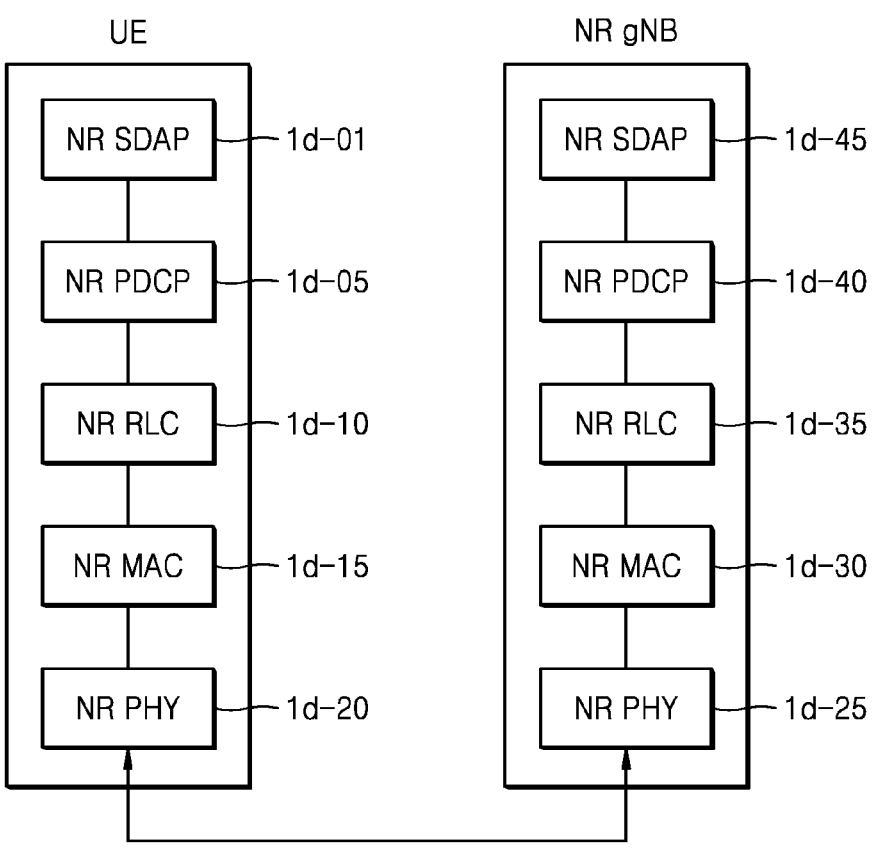
FIG. 1D is a diagram illustrating a radio protocol architecture of a next-generation mobile communication system.

FIG. 1D is a diagram illustrating a radio protocol architecture of a next-generation mobile communication system. FIG. 1D is a diagram illustrating a radio protocol architecture of the next-generation mobile communication system to which embodiments of the present disclosure are applicable.

Referring to FIG. 1D, a radio protocol of the next-generation mobile communication system may include NR Service Data Adaptation Protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB.

Main functions of the NR SDAP layer 1d-01 or 1d-45 may include some of the following functions.

Transfer of user plane data

Mapping between a QoS flow and a DRB for both DL and UL

Marking QoS flow identifier (ID) in both DL and UL packets

Reflective QoS flow to DRB mapping for the UL SDAP PDUs.

With regard to the NR SDAP, the UE may be configured with information about whether to use a header of the NR SDAP layer or to use functions of the NR SDAP layer by using an RRC message per PDCP layer, per bearer, or per logical channel, When the SDAP header is configured, a 1-bit non access stratum (NAS) reflective QoS indicator and a 1-bit access stratum (AS) reflective QoS indicator of the SDAP header may be used to indicate the UE to update or reconfigure UL and DL QoS flow and data bearer mapping information. The SDAP header may include QoS flow ID information indicating QoS. QoS information may be used as data processing priority information or scheduling infor- mation for appropriately supporting a service.

Main functions of the NR PDCP layer 1d-05 or 1d-40 may include some of functions below.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

The reordering function of the NR PDCP layer may include a function of reordering PDCP PDUs received from a lower layer, on a PDCP sequence number (SN) basis, and a function of delivering the reordered data to an upper layer in order. Alternatively, the reordering function of the NR PDCP layer may include a function of delivering the reor- dered data to an upper layer out of order, a function of recording missing PDCP PDUs by reordering the received PDCP PDUs, a function of reporting status information of the missing PDCP PDUs to a transmitter, and a function of requesting to retransmit the missing PDCP PDUs.

Main functions of the NR RLC layer 1d-10 or 1d-35 may include some of the following functions.

Transfer of upper layer PDUs

In-sequence delivery of upper layer PDUs

Out-of-sequence delivery of upper layer PDUs

Error correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

The in-sequence delivery function of the NR RLC layer may indicate a function of delivering RLC SDUs received from a lower layer, to an upper layer in order. The in- sequence delivery function of the NR RLC layer may include, when a plurality of RLC SDUs segmented from one RLC SDU are received, a function of reassembling the RLC SDUs and delivering the reassembled RLC SDU, a function of reordering received RLC PDUs on a RLC SN or PDCP SN basis, a function of recording missing RLC PDUs by reordering the received RLC PDUs, a function of reporting status information of the missing RLC PDUs to a transmit- ter, a function of requesting to retransmit the missing RLC PDUs, and the like. The in-sequence delivery function of the NR RLC layer may include a function of delivering only RLC SDUs prior to a missing RLC SDU, to an upper layer in order when the missing RLC SDU exists, or a function of delivering all RLC SDUs received before a timer starts, to an upper layer in order when a certain timer expires, even when a missing RLC SDU exists, or a function of delivering all RLC SDUs received up to a current time, to an upper layer in order when a certain timer expires, even when a missing RLC SDU exists.

Also, the NR RLC layer may process the RLC PDUs in order of reception and may deliver the RLC PDUs to the NR PDCP layer regardless of SNs (out-of-sequence delivery), and when a segment is received, the NR RLC layer may reassemble the segment with other segments stored in a buffer or subsequently received, into a whole RLC PDU and may deliver the RLC PDU to the NR PDCP layer. The NR RLC layer may not have a concatenation function, and the concatenation function may be performed by the NR MAC layer or be replaced with a multiplexing function of the NR MAC layer.

The out-of-sequence delivery function of the NR RLC layer may refer to a function of directly delivering RLC SDUs received from a lower layer, to an upper layer out of order, may include a function of reassembling a plurality of RLC SDUs segmented from one RLC SDU and delivering the reassembled RLC SDU when the segmented RLC SDUs are received, and may include a function of recording missing RLC PDUs by storing RLC SNs or PDCP SNs of received RLC PDUs and reordering the received RLC PDUs.

The NR MAC layer 1d-15 or 1d-30 may be connected to a plurality of NR RLC layers configured for one UE, and main functions of the NR MAC layer may include some of functions below.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

The NR PHY layer 1d-20 or 1d-25 may channel-code and modulate upper layer data into OFDM symbols and transmit the OFDM symbols via a wireless channel, or may demodu- late OFDM symbols received via a wireless channel and channel-decode and transmit the OFDM symbols to an upper layer.

Figure 1E:
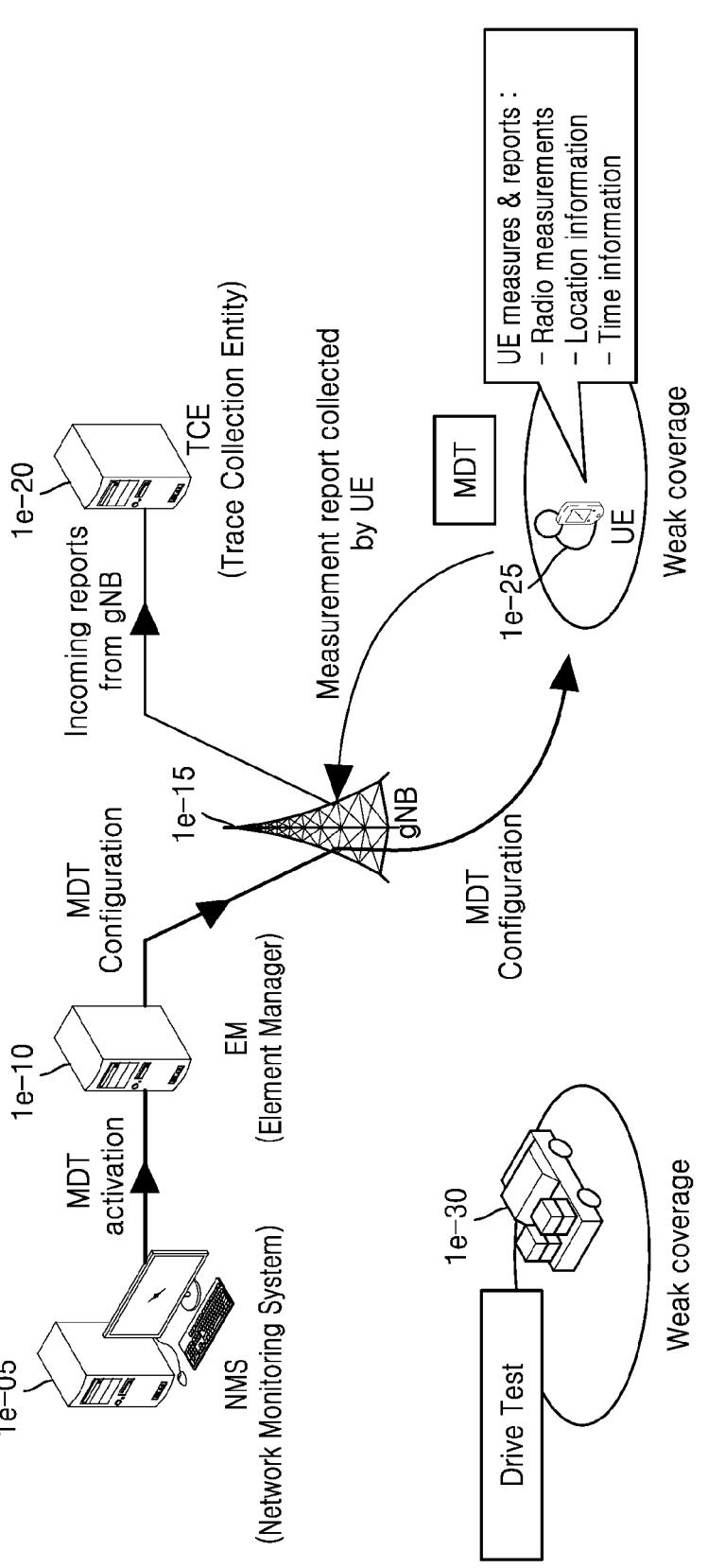
FIG. 1E is a diagram illustrating a technique of collecting and reporting cell measurement information according to an embodiment of the present disclosure.

FIG. 1E is a diagram illustrating a technique of collecting and reporting cell measurement information according to an embodiment of the present disclosure.

When a network is build or optimized, a mobile network operator (MNO) may perform a procedure for measuring a signal strength in a service area which is generally predicted, and arranging or re-adjusting BSs in the service area, based on the measured signal strength. The MNO loads signal measurement equipment in a vehicle, and collects cell measurement information in a generally-predicted service area, which requires many times and costs. A process of collecting the cell measurement information is performed using a vehicle and thus is commonly referred to as a drive test 1e-30.

A UE 1e-25 has a function of measuring a signal and transmitting a result of the measurement to a BS so as to support operations including cell reselection or handover (HO), serving cell addition, or the like in cell switching. Therefore, the MNO may use, instead of the drive test, the UE 1e-25 in a service area so as to collect measurement information, and this may be referred to as a minimization of drive test (MDT). The MNO may configure an MDT operation for specific UEs via configuration devices 1e-05, 1e-10, and 1e-15 of a network. Also, the UEs in an RRC connected mode (RRC_CONNECTED), an RRC idle mode (RRC_IDLE) or an RRC inactive mode (RRC_INACTIVE) may collect and store signal strength information from a serving cell and neighboring cells. Furthermore, a UE may also store various information such as location information, time information, signal quality information, or the like. The information stored in the UE may be reported to at least one (e.g., the BS 1e-15) of the configuration devices of the network when the UEs are in a connected mode, and the stored information may be transmitted to a specific server 1e-20.

The MDT operation may be broadly divided into immediate MDT and logged MDT.

The immediate MDT is to immediately report the collected information to the network. As the collected information has to be immediately reported, only a UE in an RRC connected mode can perform the immediate MDT. For example, the immediate MDT may be performed by re-using a radio resource management (RRC) measurement procedure for supporting an operation such as handover and serving cell addition, and location information, time information, etc. may be additionally reported.

The logged MDT is not to immediately report the collected information to a network but a UE stores the collected information, and afterward, when the UE transitions to an RRC connected mode, the UE reports the stored information. For example, a UE in an RRC idle mode or an RRC inactive mode in which the UE cannot immediately report the collected information may perform the logged MDT. In an embodiment of the present disclosure, a UE in an RRC inactive mode introduced to a next-generation mobile communication system performs the logged MDT. When a specific UE is in an RRC connected mode, a network may provide the UE with configuration information for the UE to perform a logged MDT operation. After the UE transitions to an RRC idle mode or an RRC inactive mode, the UE may collect and store configured information. RRC states of the UE that performs the immediate MDT and the logged MDT may be shown in Table 1 below.

TABLE 1

| | RRC state |
|---|---|
| Immediate MDT | RRC_CONNECTED |
| Logged MDT | RRC_IDLE, RRC_INACTIVE |

Figure 1F:
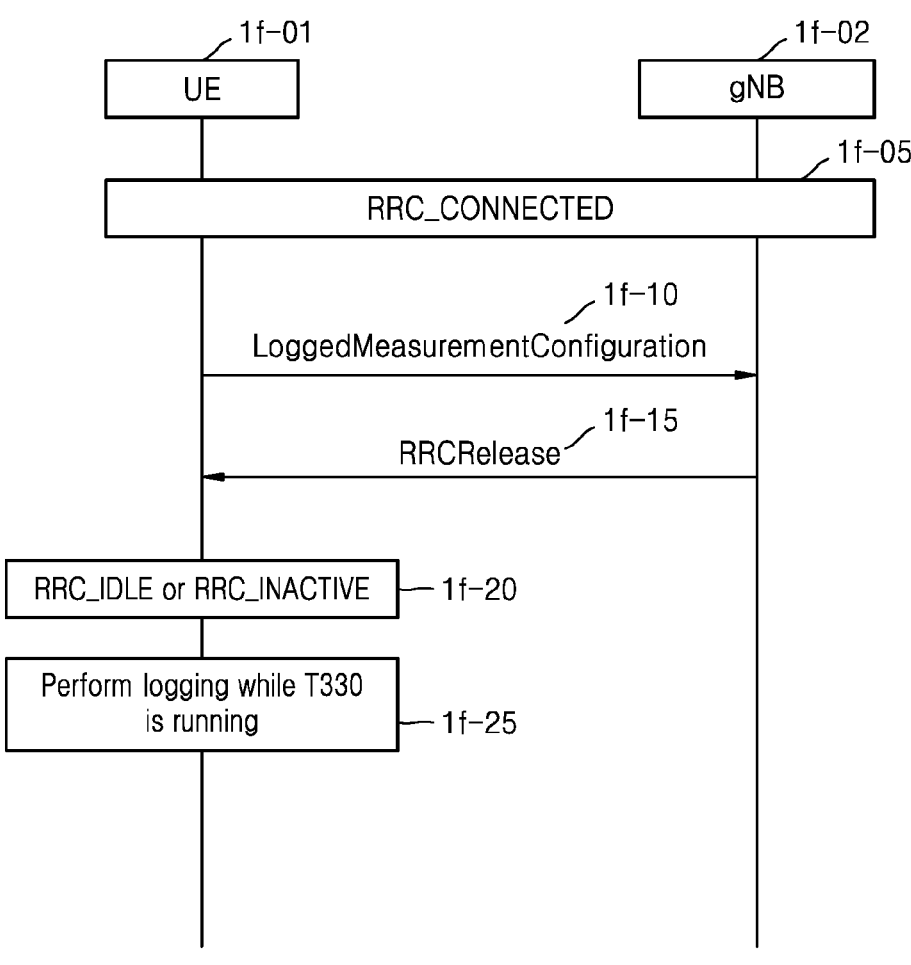
FIG. 1F is a flowchart of a user equipment (UE) performing measurement logging.

FIG. 1F is a flowchart of a UE performing measurement logging.

Referring to FIG. 1F, in operation 1f-05, a UE 1f-01 may establish RRC connection to an NR gNB 1f-02 and thus may be in an RRC connected mode (RRC_CONNECTED).

In operation 1f-10, the NR gNB 1f-02 may transmit a logged measurement configuration message (LoggedMeasurementConfiguration) to the UE 1f-01 in the RRC connected mode. The LoggedMeasurementConfiguration message may include configuration information for the UE 1f-01 in an RRC idle mode (RRC_IDLE) or an RRC inactive mode (RRC_INACTIVE) to log measurement results.

In operation 1f-10, when the LoggedMeasurementConfiguration message is received, the UE may perform a procedure below.

If timer T330 is running, the UE may stop timer T330 (stop timer T330, if running).

If logged measurement configuration and logged measurement information are stored in a VarLogMeasConifg variable, the UE may discard the logged measurement configuration stored in the VarLogMeasConifg variable and logged measurement information stored in a VarLogMeasReport variable (if stored, discard the logged measurement configuration as well as the logged measurement information, i.e. release the UE variables VarLogMeasConfig and VarLogMeasReport).

If the received LoggedMeasurementConfiguration message includes loggingDuration, reportType, and areaConfiguration, the loggingDuration, the UE may store the reportType, and the areaConfiguration in VarLogMeasConfig (store the received loggingDuration, reportType and areaConfiguration, if included, in VarLogMeasConfig).

If the received LoggedMeasurementConfiguration message includes plmn-IdentityList, the UE may set plmn-IdentityList in the VarLogMeasReport variable to include a registered public land mobile network (RPLMN) as well as public land mobile networks (PLMNs) included in received plmn-IdentityList (if the LoggedMeasurementConfiguration message includes plmn-IdentityList, set plmn-IdentityList in VarLogMeasReport to include the RPLMN as well as the PLMNs included in plmn-IdentityList). If the received LoggedMeasurementConfiguration message does not include plmn-IdentityList, the UE may set plmn-IdentityList in the VarLogMeasReport variable to include an RPLMN (set plmn-IdentityList in VarLogMeasReport to include the RPLMN).

The UE may store, in the VarLogMeasReport variable, absoluteTimeInfo, traceReference, traceRecordingSessionRef, and tce-ID included in the received LoggedMeasurementConfiguration message (store the received absoluteTimeInfo, traceReference, traceRecordingSessionRef and tce-Id in VarLogMeasReport).

If the received LoggedMeasurementConfiguration message includes at least one of bt-NameList, wlan-NameList, and sensorNameList, the UE may store at least one of bt-NameList, wlan-NameList, and sensorNameList in VarLogMeasConfig (store the received bt-NameList, if included, wlan-NameList, if included, sensorNameList, if included, in VarLogMeasConfig).

The UE may set a value of timer T330 to a value of loggingDuration included in the received LoggedMeasurementConfiguration message, and may start timer T330 (start timer T330 with the timer value set to the loggingDuration).

For example, the LoggedMeasurementConfiguration message may have a structure of abstract syntax notation one (ASN.1) as below.

```
LoggedMeasurementConfiguration-r16 ::=   SEQUENCE {
    criticalExtensions                        CHOICE {
        loggedMeasurementConfiguration-r16         LoggedMeasurementConfiguration-r16-IEs,
        criticalExtensionsFuture                   SEQUENCE { }
    }
}
LoggedMeasurementConfiguration-r16-IEs ::=   SEQUENCE {
    traceReference-r16                           TraceReference-r16,
    traceRecordingSessionRef-r16                 OCTET STRING (SIZE (2)),
```

-continued

```
    tce-Id-r16                          OCTET STRING (SIZE (1)),
    absoluteTimeInfo-r16                AbsoluteTimeInfo-r16,
    areaConfiguration-r16               AreaConfiguration-r16
OPTIONAL,   --Need R
    plmn-IdentityList-r16               PLMN-IdentityList2-r16
OPTIONAL,   --Need R
    bt-NameList-r16                     SetupRelease {BT-NameList-r16}
OPTIONAL,   --Need M
    wlan-NameList-r16                   SetupRelease {WLAN-NameList-r16}
OPTIONAL,   --Need M
    sensor-NameList-r16                 SetupRelease {Sensor-NameList-r16}
OPTIONAL,   --Need M
    loggingDuration-r16                 LoggingDuration-r16,
    reportType                          CHOICE {
        periodical                          LoggedPeriodicalReportConfig-r16,
        eventTriggered                      LoggedEventTriggerConfig-r16,
        ...
    },
    lateNonCriticalExtension            OCTET STRING
OPTIONAL,
    nonCriticalExtension                SEQUENCE { }
OPTIONAL
}
LoggedPeriodicalReportConfig-r16 ::=    SEQUENCE {
    loggingInterval-r16                     LoggingInterval-r16,
    ...
}
LoggedEventTriggerConfig-r16 ::=        SEQUENCE {
    eventType-r16                           EventType-r16,
    loggingInterval-r16                     LoggingInterval-r16,
    ...
}
EventType-r16 ::= CHOICE {
    outOfCoverage           NULL,
    eventL1                 SEQUENCE {
        l1-Threshold            MeasTriggerQuantity,
        hysteresis              Hysteresis,
        timeToTrigger           TimeToTrigger
    },
    ...
}
```

In operation 1f-15, the NR gNB 1f-02 may transmit an RRC connection release message (RRCRelease) to the UE 1f-01 so as to transition the UE 1f-01 in an RRC connected mode to an RRC idle mode (RRC_IDLE) or an RRC inactive mode (RRC_INACTIVE). When the RRCRelease message contains suspendConfig information, in operation 1f-20, the UE 1f-01 may transition to the RRC inactive mode, and when the RRCRelease message does not contain the suspendConfig information, the UE may transition to the RRC idle mode.

In operation 1f-25, the UE 1f-01 having transitioned to the RRC idle mode or the RRC inactive mode may perform logging when timer T330 is running. The UE 1f-01 may perform logging according to a procedure below.

Figure 1G:
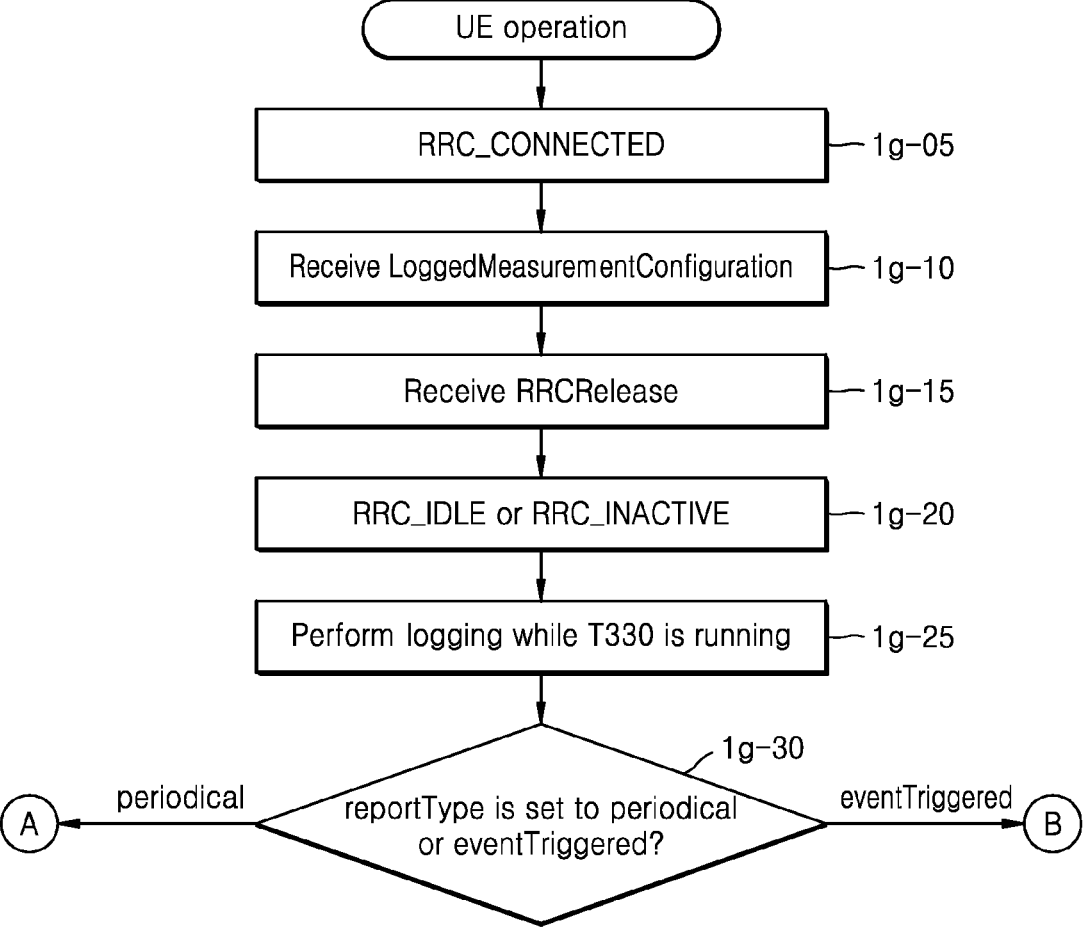
FIG. 1Ga is a flowchart of a UE performing measurement logging according to an embodiment of the present disclosure.
Figure 1G:
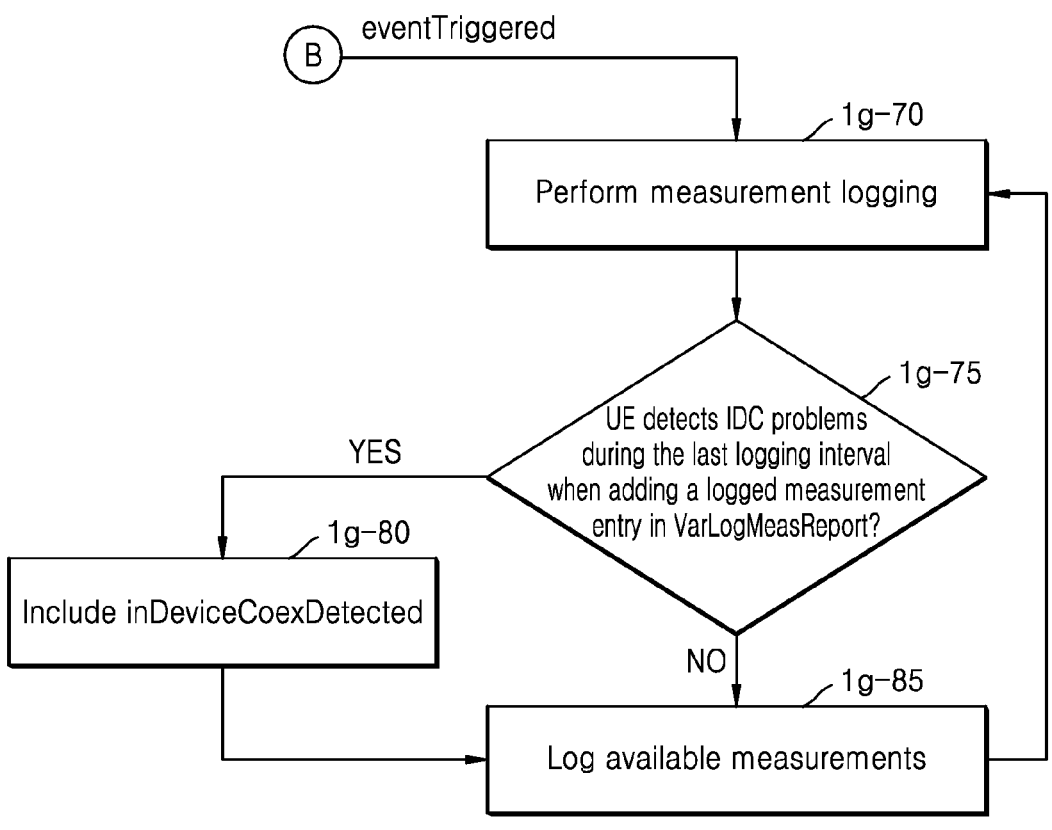

If reportType is set to periodical in the VarLogMeasConfig variable (if the reportType is set to periodical in the VarLogMeasConfig)

if the UE is in a camped normally state on an NR cell, and an RPLMN is included in plmn-IdentityList stored in VarLogMeasReport (if the UE is camping normally on an NR cell and if the RPLMN is included in plmn-IdentityList stored in VarLogMeas-Report and) and if areaConfiguration is not included in VarLogMeasConfig (if areaConfiguration is not included in VarLogMeasConfig) or if a current serving cell is included in a cell indicated by areaConfig of areaConfiguration in VarLogMeasConfig (if the serving cell is part of the area indicated by areaConfig in areaConfiguration in VarLogMeasConfig)

the UE may periodically perform logging at regular time intervals, as defined by loggingInterval in VarLogMeasConfig (perform the logging at regular time intervals, as defined by the loggingInterval in the VarLogMeasConfig)

else if the UE is in any cell selection state defined in TS 38.304 (else if the UE is in any cell selection state as specified in TS 38.304), the UE may periodically perform logging at regular time intervals, as defined by loggingInterval in VarLogMeasConfig (perform the logging at regular time intervals, as defined by the loggingInterval in the VarLogMeasConfig)

else if reportType is set to eventTriggered and eventType is set to OutOfCoverage in the VarLogMeasConfig variable (else if the reportType is set to eventTriggered and eventType is set to OutofCoverage)

the UE may periodically perform logging at regular time intervals, as defined by loggingInterval in Var-LogMeasConfig only when the UE is in any cell selection state (perform the logging at regular time intervals, as defined by the loggingInterval in the VarLogMeasConfig only when the UE is in any cell selection state)

the UE may immediately perform logging as soon as the UE transitions from any cell selection state to camped normally state (perform the logging imme-diately upon transitioning from the any cell selection state to the camped normally state)

else if reportType is set to eventTriggered and eventType
    is set to eventL1 in the VarLogMeasConfig variable
    (else if the reportType is set to eventTriggered and
    eventType is set to eventL1)
    if the UE is in a camped normally state on an NR cell
        and an RPLMN is included in plmn-IdentityList
        stored in VarLogMeasReport (if the UE is camping
        normally on an NR cell and if the RPLMN is
        included in plmn-IdentityList stored in VarLogMeas-
        Report and) and if areaConfiguration is not included
        in VarLogMeasConfig (if areaConfiguration is not
        included in VarLogMeasConfig) or a current serving
        cell is included in a cell indicated by areaConfig of
        areaConfiguration in VarLogMeasConfig (if the
        serving cell is part of the area indicated by areaCon-
        fig in areaConfiguration in VarLogMeasConfig)
        the UE may periodically perform logging at regular
            time intervals, as defined by loggingInterval in
            VarLogMeasConfig only when conditions indi-
            cated by eventL1 are satisfied (perform the log-
            ging at regular time intervals, as defined by the
            loggingInterval in the VarLogMeasConfig)
when performing the logging, the UE may perform fol-
    lowings
    the UE may set relativeTimeStamp to indicate an
        elapsed time after logged measurement configuration
        was received (set the relativeTimeStamp to indicate
        the elapsed time since the moment at which the
        logged measurement configuration was received).
    If detailed location information became available dur-
        ing a last logging interval, the UE may set content of
        locationInfo as in 5.3.3.7 of TS 38.331 (if detailed
        location information became available during the
        last logging interval, set the content of the location-
        Info as in 5.3.3.7 in TS 38.331)
    if the UE is in any cell selection state as defined in TS
        38.304 (if the UE is in any cell selection state as
        specified in TS 38.304):
        the UE may set anyCellSelectionDetected to indicate
            that a suitable or acceptable cell is not detected
            (set anyCellSelectionDetected to indicate the
            detection of no suitable or no acceptable cell
            found).
        the UE may set servCellIdentity to indicate global
            cell identity of a last logged cell on which the UE
            was camping (set the servCellIdentity to indicate
            global cell identity of the last logged cell that the
            UE was camping on).
        the UE may set measResultServingCell to include
            quantities of the last logged cell on which the UE
            was camping (set the measResultServingCell to
            include the quantities of the last logged cell the
            UE was camping on).
    Else (that is, if the UE is not in any cell selection state):
        the UE may set servCellIdentity to indicate global
            cell identity of a cell on which the UE is camping
            (set the servCellIdentity to indicate global cell
            identity of the cell the UE is camping on).
        the UE may set measResultServingCell to include
            quantities of the cell on which the UE is camping
            (set the measResultServingCell to include the
            quantities of the cell the UE is camping on).
        If available, the UE may set measResultNeighCells,
            in order of decreasing ranking-criterion as used for
            cell reselection, to include neighboring cell mea-
            surement that became available during a last log-
            ging interval for at most the following number of neighboring cells: 6 intra-frequency and 3 inter-
frequency neighbors per frequency as well as 3
inter-RAT neighbors, per frequency. The UE may
set frequencies per radio access technology (RAT)
and according to the following (if available, set
the measResultNeighCells, in order of decreasing
ranking-criterion as used for cell re-selection, to
include neighbouring cell measurements that
became available during the last logging interval
for at most the following number of neighbouring
cells: 6 intra-frequency and 3 inter-frequency
neighbours per frequency as well as 3 inter-RAT
neighbours, per frequency/set of frequencies per
RAT and according to the following).
    For each included neighbour cell, the UE may
        include optional fields that are available (for
        each neighbour cell included, include the
        optional fields that are available)
when a memory reserved for logged measurement infor-
    mation is full, the UE may stop timer T330 and may
    perform the same task as performed when timer T330
    expires, as defined in 5.5a.1.4 of TS 38.331 (when the
    memory reserved for the logged measurement infor-
    mation becomes full, stop timer T330 and perform the
    same actions as performed upon expiry of T330, as
    specified in 5.5a.1.4 in TS 38.331.).
FIGS. 1Ga, 1Gb, and 1Gc are flowcharts of a UE per-
forming measurement logging according to an embodiment
of the present disclosure.
    Referring to FIG. 1Ga, in operation 1g-05, the UE may
establish RRC connection to an NR BS and thus may be in
an RRC connected mode (RRC_CONNECTED).
    In operation 1g-10, the UE in the RRC connected mode
may receive a LoggedMeasurementConfiguration message
from the NR BS. When the UE receives the LoggedMea-
surementConfiguration message, the UE may apply the
LoggedMeasurementConfiguration message according to
the embodiment described above.
    In operation 1g-15, the UE may receive an RRC connec-
tion release message (RRCRelease) from the NR BS.
    In operation 1g-20, the UE may transition to an RRC idle
mode (RRC_IDLE) or an RRC inactive mode (RRC_INAC-
TIVE) according to the embodiment described above.
    In operation 1g-25, the UE having transitioned to the RRC
idle mode or the RRC inactive mode may perform logging
if timer T330 is running.
    In operation 1g-30, the UE may determine whether
reportType is set to periodical or eventTriggered in the
VarLogMeasConfig variable.
    FIG. 1Gb is a flowchart of operations performed by the
UE after the UE determines that reportType is set to peri-
odical in the VarLogMeasConfig variable in operation 1g-30
of FIG. 1Ga.
    When the UE determines that reportType is set to peri-
odical in the VarLogMeasConfig variable in operation 1g-30
of FIG. 1Ga, referring to FIG. 1Gb, in operation 1g-35, the
UE may determine whether measurement logging is sus-
pended.
    When the UE determines that measurement logging is
suspended ('YES' in operation 1g-35), in operation 1g-40,
the UE may determine whether IDC problems detected by
the UE are resolved during a last logging interval.
    When the UE determines that the detected IDC problems
are not resolved during the last logging interval ('NO' in
operation 1g-40), in operation 1g-45, the UE may continu-
ously suspend measurement logging. Then, the UE may
re-perform operation 1g-40.

When the UE determines that the detected IDC problems are resolved during the last logging interval ('YES' in operation 1g-40), in operation 1g-50, the UE may resume measurement logging. When the UE resumes measurement logging or determines that measurement logging is not suspended ('NO' in operation 1g-35), in operation 1g-50, the UE may perform measurement logging. In operation 1g-50, a procedure below may be performed.

If the UE is in a camped normally state on an NR cell and an RPLMN is included in plmn-IdentityList stored in VarLogMeasReport (if the UE is camping normally on an NR cell and if the RPLMN is included in plmn-IdentityList stored in VarLogMeasReport and) and if areaConfiguration is not included in VarLogMeasConfig (if areaConfiguration is not included in VarLog-MeasConfig) or a current serving cell is included in a cell indicated by areaConfig of areaConfiguration in VarLogMeasConfig (if the serving cell is part of the area indicated by areaConfig in areaConfiguration in VarLogMeasConfig)

the UE may periodically perform logging at regular time intervals, as defined by loggingInterval in Var-LogMeasConfig (perform the logging at regular time intervals, as defined by the loggingInterval in the VarLogMeasConfig)

else if the UE is in any cell selection state defined in TS 38.304 (else if the UE is in any cell selection state as specified in TS 38.304), the UE may periodically perform logging at regular time intervals, as defined by loggingInterval in Var-LogMeasConfig (perform the logging at regular time intervals, as defined by the loggingInterval in the VarLogMeasConfig)

In operation 1g-55, when the UE attempts to add a logged measurement entry to the VarLogMeasReport variable, the UE may determine whether IDC problems are detected during a last logging interval.

When the IDC problems are detected during the last logging interval ('YES' in operation 1g-55), in operation 1g-60, the UE may include inDeviceCoexDetected in the VarLogMeasReport variable, and may suspend measurement logging in a next logging interval. Then, the UE may perform operation 1g-35.

When the IDC problems are not detected during the last logging interval ('NO' in operation 1g-55), in operation 1g-65, the UE may log available measurement information. When logging the available measurement information, the UE may perform a procedure below, and may perform operation 1g-35.

the UE may set relativeTimeStamp to indicate an elapsed time after logged measurement configuration was received (set the relativeTimeStamp to indicate the elapsed time since the moment at which the logged measurement configuration was received)

if detailed location information became available during a last logging interval, the UE may set content of loca-tionInfo as in 5.3.3.7 of TS 38.331 (if detailed location information became available during the last logging interval, set the content of the locationInfo as in 5.3.3.7 in TS 38.331)

if the UE is in any cell selection state as defined in TS 38.304 (if the UE is in any cell selection state as specified in TS 38.304):

the UE may set anyCellSelectionDetected to indicate that a suitable or acceptable cell is not detected (set anyCellSelectionDetected to indicate the detection of no suitable or no acceptable cell found)

the UE may set servCellIdentity to indicate global cell identity of a last logged cell on which the UE was camping (set the servCellIdentity to indicate global cell identity of the last logged cell that the UE was camping on)

the UE may set measResultServingCell to include quantities of the last logged cell on which the UE was camping (set the measResultServingCell to include the quantities of the last logged cell the UE was camping on)

else (that is, if the UE is not in any cell selection state):

the UE may set servCellIdentity to indicate global cell identity of a cell on which the UE is camping (set the servCellIdentity to indicate global cell identity of the cell the UE is camping on)

the UE may set measResultServingCell to include quantities of the cell on which the UE is camping (set the measResultServingCell to include the quantities of the cell the UE is camping on)

If available, the UE may set measResultNeighCells, in order of decreasing ranking-criterion as used for cell reselection, to include neighbouring cell measure-ment that became available during a last logging interval for at most the following number of neigh-bouring cells: 6 intra-frequency and 3 inter-fre-quency neighbors per frequency as well as 3 inter-RAT neighbours, per frequency. The UE may set frequencies per RAT and according to the following (if available, set the measResultNeighCells, in order of decreasing ranking-criterion as used for cell re-selection, to include neighbouring cell measure-ments that became available during the last logging interval for at most the following number of neigh-bouring cells: 6 intra-frequency and 3 inter-fre-quency neighbours per frequency as well as 3 inter-RAT neighbours, per frequency/set of frequencies per RAT and according to the following).

For each included neighbour cell, the UE may include optional fields that are available (for each neighbour cell included, include the optional fields that are available)

when a memory reserved for logged measurement infor-mation is full, the UE may stop timer T330 and may perform the same task as performed when timer T330 expires, as defined in 5.5a.1.4 of TS 38.331 (when the memory reserved for the logged measurement infor-mation becomes full, stop timer T330 and perform the same actions as performed upon expiry of T330, as specified in 5.5a.1.4 in TS 38.331).

FIG. 1Gc is a flowchart of operations performed by the UE after the UE determines that reportType is set to event-Triggered in the VarLogMeasConfig variable in operation 1g-30 of FIG. 1Ga.

When the UE determines that reportType is set to event-Triggered in the VarLogMeasConfig variable in operation 1g-30 of FIG. 1Ga, referring to FIG. 1Gc, in operation 1g-70, the UE may perform measurement logging. In opera-tion 1g-70, the UE may perform a procedure below.

Else if reportType is set to eventTriggered in the VarLog-MeasConfig variable and eventType is set to OutOf-Coverage (else if the reportType is set to eventTrig-gered and eventType is set to OutofCoverage)

the UE may periodically perform logging at regular time intervals, as defined by loggingInterval in Var-LogMeasConfig only when the UE is in any cell selection state (perform the logging at regular time intervals, as defined by the loggingInterval in the VarLogMeasConfig only when the UE is in any cell selection state)

the UE may immediately perform logging as soon as the UE transitions from any cell selection state to a camped normally state (perform the logging immediately upon transitioning from the any cell selection state to the camped normally state)

else if reportType is set to eventTriggered and eventType is set to eventL1 in the VarLogMeasConfig variable (else if the reportType is set to eventTriggered and eventType is set to eventL1)

if the UE is in a camped normally state on an NR cell, and an RPLMN is included in plmn-IdentityList stored in VarLogMeasReport (if the UE is camping normally on an NR cell and if the RPLMN is included in plmn-IdentityList stored in VarLogMeasReport and) and if areaConfiguration is not included in VarLogMeasConfig (if areaConfiguration is not included in VarLogMeasConfig) or if a current serving cell is included in a cell indicated by areaConfig of areaConfiguration in VarLogMeasConfig (if the serving cell is part of the area indicated by areaConfig in areaConfiguration in VarLogMeasConfig)

the UE may periodically perform logging at regular time intervals, as defined by loggingInterval in VarLogMeasConfig only when conditions indicated by eventL1 are satisfied (perform the logging at regular time intervals, as defined by the loggingInterval in the VarLogMeasConfig)

In operation 1g-75, the UE may determine whether IDC problems are detected in a last logging interval.

When the IDC problems are detected in the last logging interval ('YES' in operation 1g-75), in operation 1g-80, the UE may include inDeviceCoexDetected in the VarLogMeasReport variable and may perform operation 1g-85. When the IDC problems are not detected in the last logging interval ('NO' in operation 1g-75), the UE may perform operation 1g-85.

In operation 1g-85, the UE may log available measurement information. When logging the available measurement information, the UE may perform at least one of processes below, and may perform operation 1g-70.

The UE may set relativeTimeStamp to indicate an elapsed time after logged measurement configuration was received (set the relativeTimeStamp to indicate the elapsed time since the moment at which the logged measurement configuration was received)

if detailed location information became available during a last logging interval, the UE may set content of locationInfo as in 5.3.3.7 of TS 38.331 (if detailed location information became available during the last logging interval, set the content of the locationInfo as in 5.3.3.7 in TS 38.331)

if the UE is in any cell selection state as defined in TS 38.304 (if the UE is in any cell selection state as specified in TS 38.304):

the UE may set anyCellSelectionDetected to indicate that a suitable or acceptable cell is not detected (set anyCellSelectionDetected to indicate the detection of no suitable or no acceptable cell found)

the UE may set servCellIdentity to indicate global cell identity of a last logged cell on which the UE was camping (set the servCellIdentity to indicate global cell identity of the last logged cell that the UE was camping on)

the UE may set measResultServingCell to include quantities of the last logged cell on which the UE was camping (set the measResultServingCell to include the quantities of the last logged cell the UE was camping on)

else (that is, if the UE is not in any cell selection state):

the UE may set servCellIdentity to indicate global cell identity of a cell on which the UE is camping (set the servCellIdentity to indicate global cell identity of the cell the UE is camping on)

the UE may set measResultServingCell to include quantities of the cell on which the UE is camping (set the measResultServingCell to include the quantities of the cell the UE is camping on)

the UE may perform at least one of the following actions

Action 1: If available, the UE may set measResultNeighCells, in order of decreasing ranking-criterion as used for cell reselection, to include neighbouring cell measurement that became available during a last logging interval for at most the following number of neighbouring cells: 6 intra-frequency and 3 inter-frequency neighbours per frequency as well as 3 inter-RAT neighbours, per frequency. The UE may set frequencies per RAT and according to the following (if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies per RAT and according to the following).

For each included neighbor cell, the UE may include optional fields that are available (for each neighbour cell included, include the optional fields that are available)

Action 2: if the UE cannot detect IDC problems, if available, the UE may set the measResultNeighCells, in order of decreasing ranking-criterion as used for cell re-selection, to include neighboring cell measurements that became available during the last logging interval for at most the following number of neighboring cells: 6 intra-frequency and 3 inter-frequency neighbours per frequency as well as 3 inter-RAT neighbours, per frequency. The UE may set frequencies per RAT and according to the following (if the UE does not detect IDC problems, if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies per RAT and according to the following).

For each included neighbour cell, the UE may include optional fields that are available (for each neighbour cell included)

Action 3: the UE may include information about neighbouring frequency or cells that are affected by IDC problems (include the information which neighboring frequency or cells are affected by IDC problems)

when a memory reserved for logged measurement information is full, the UE may stop timer T330 and may perform the same task as performed when timer T330 expires, as defined in 5.5a.1.4 of TS 38.331 (when the memory reserved for the logged measurement information becomes full, stop timer T330 and perform the same actions as performed upon expiry of T330, as specified in 5.5a.1.4 in TS 38.331.).

The UE according to an embodiment of the present disclosure is characterized to perform measurement logging according to detection or no-detection of IDC problems, when reportType is set to periodical. On the other hand, when reportType is set to eventTriggered, the UE does not suspend or resume measurement logging but always performs measurement logging when an event condition is satisfied. When reportType is set to OutofCoverage and the UE is in any cell selection state, the UE always performs measurement logging regardless of detection or no-detection of IDC problems. Also, when reportType is set to eventL1 and conditions indicated by eventL1 are satisfied, the UE always performs measurement logging regardless of detection or no-detection of IDC problems.

In addition, even when reportType is set to eventTriggered and an event condition is not satisfied, the UE according to an embodiment of the present disclosure may include inDeviceCoexDetected and perform logging when IDC problems are detected according to loggingInterval stored in VarLogMeasConfig. When performing logging, the UE may perform some or all operations among operations performed in operation 1g-85 described above.

Figure 1H:
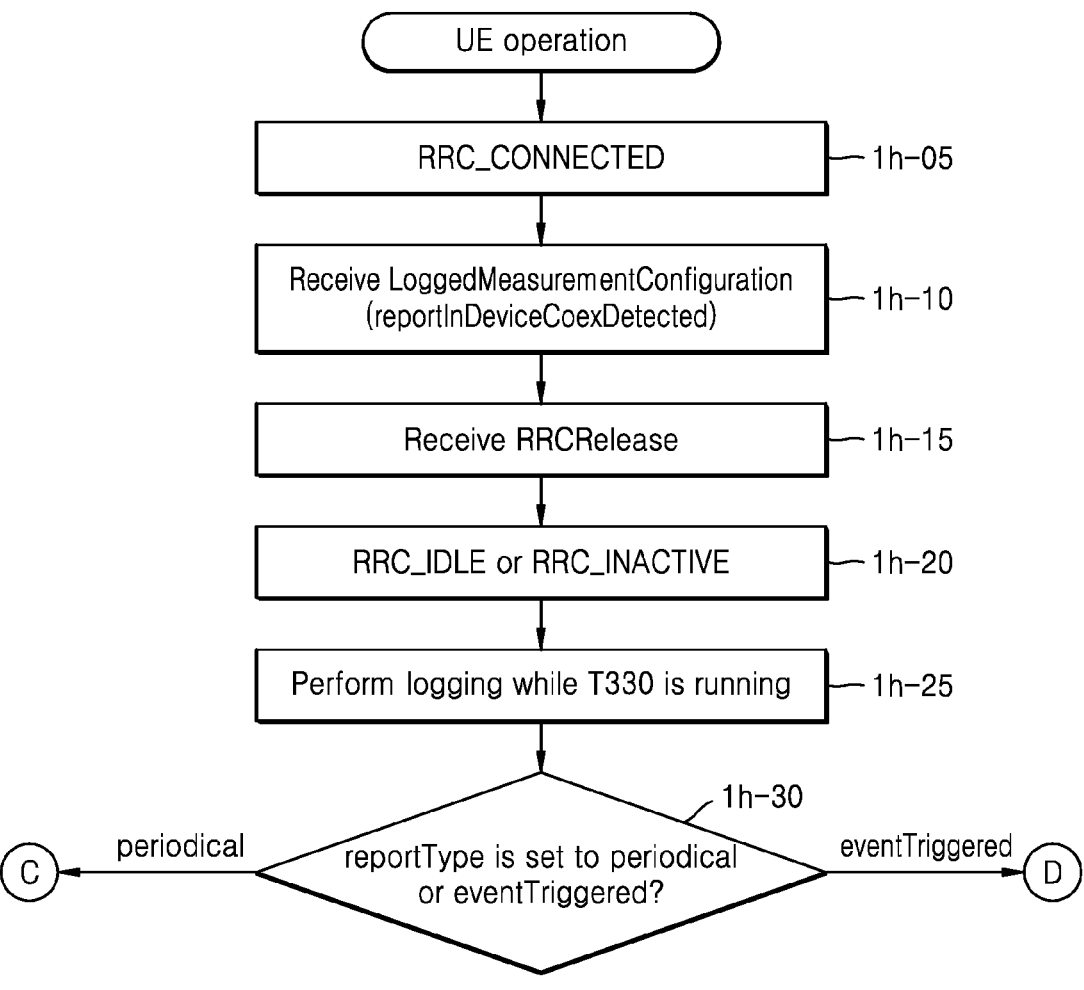
FIG. 1Ha is a flowchart of a UE performing measurement logging according to an embodiment of the present disclosure.
Figure 1H:
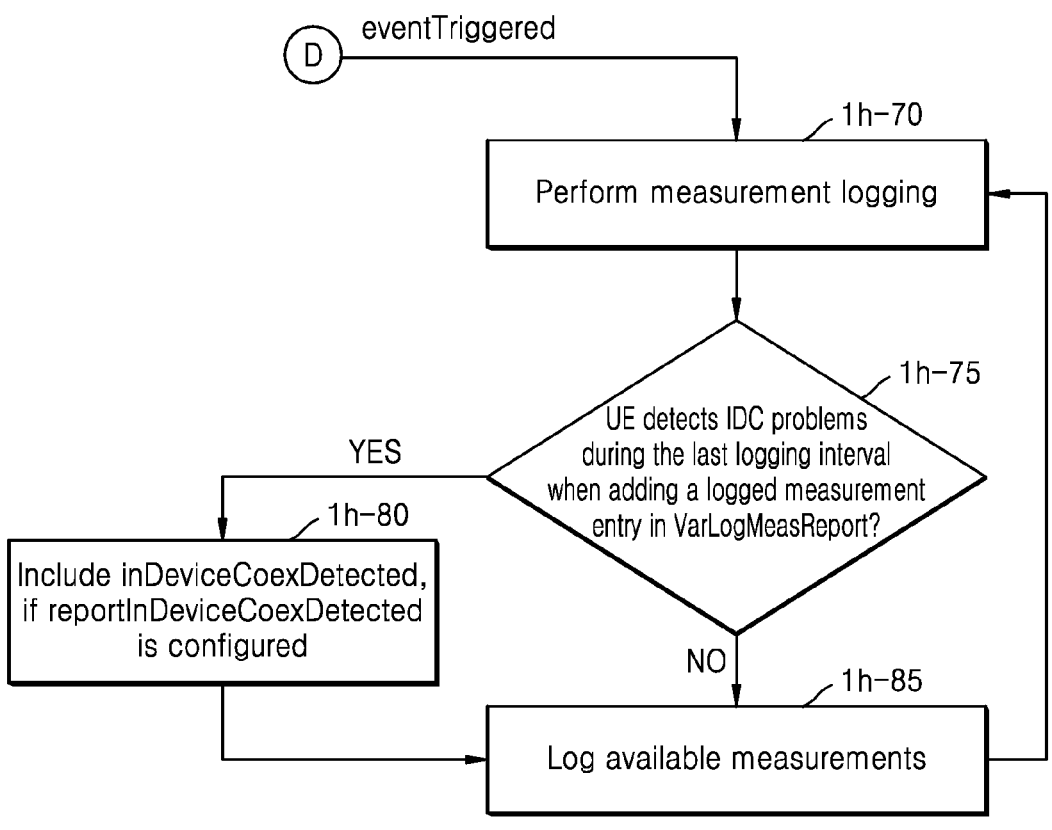

FIGS. 1Ha, 1Hb, and 1Hc are flowcharts of a UE performing measurement logging according to an embodiment of the present disclosure.

Referring to FIG. 1Ha, in operation 1h-05, the UE may establish RRC connection to an NR BS and thus may be in an RRC connected mode (RRC_CONNECTED).

In operation 1h-10, the UE in the RRC connected mode may receive a LoggedMeasurementConfiguration message from the NR BS. When the UE receives the LoggedMeasurementConfiguration message, the UE may apply the LoggedMeasurementConfiguration message according to the embodiment described above. In an embodiment of the present disclosure, it is proposed that an indicator indicating whether to include an InDeviceCoexDetected indicator when reportType is set to eventTriggered in the LoggedMeasurementConfiguration message is introduced. For example, the indicator may have a structure below.

figured, reportType is set to eventTriggered, and IDC problems are detected when logging is performed as an event condition (out of coverage or eventL1) is satisfied, the UE may not include InDeviceCoexDetected in the VarLogMeasReport variable and may log available measurement information.

In operation 1h-15, the UE may receive an RRC connection release message (RRCRelease) from the NR BS.

In operation 1h-20, the UE may transition to an RRC idle mode (RRC_IDLE) or an RRC inactive mode (RRC_INACTIVE) according to the embodiment described above.

In operation 1h-25, the UE having transitioned to the RRC idle mode or the RRC inactive mode may perform logging if timer T330 is running.

In operation 1h-30, the UE may determine whether reportType is set to periodical or eventTriggered in the VarLogMeasConfig variable.

FIG. 1Hb is a flowchart of operations performed by the UE after the UE determines that reportType is set to periodical in the VarLogMeasConfig variable in operation 1h-30 of FIG. 1Ha.

When the UE determines that reportType is set to periodical in the VarLogMeasConfig variable in operation 1h-30 of FIG. 1Ha, referring to FIG. 1Hb, in operation 1h-35, the UE may determine whether measurement logging is suspended.

When the UE determines that measurement logging is suspended ('YES' in operation 1h-35), in operation 1h-40, the UE may determine whether IDC problems detected by the UE are resolved during a last logging interval.

When the UE determines that the detected IDC problems are not resolved during the last logging interval ('NO' in operation 1h-40), in operation 1h-45, the UE may continuously suspend measurement logging. Then, the UE may re-perform operation 1h-40.

When the UE determines that the detected IDC problems are resolved during the last logging interval ('YES' in operation 1h-40), in operation 1h-50, the UE may resume measurement logging. When the UE resumes measurement logging or determines that measurement logging is not suspended ('NO' in operation 1h-35), in operation 1h-50, the UE may perform measurement logging. In operation 1h-50, a procedure below may be performed.

If the UE is in a camped normally state on an NR cell and an RPLMN is included in plmn-IdentityList stored in VarLogMeasReport (if the UE is camping normally on an NR cell and if the RPLMN is included in plmn-IdentityList stored in VarLogMeasReport and) and if areaConfiguration is not included in VarLogMeasConfig (if areaConfiguration is not included in VarLog-

```
LoggedEventTriggerConfig-r16 ::=    SEQUENCE {
    eventType-r16                       EventType-r16,
    loggingInterval-r16                 LoggingInterval-r16,
    ...,
    [[  reportInDeviceCoexDetected      ENUMERATE    {TRUE}   OPTIONAL
    ]]
}
```

If reportInDeviceCoexDetected is configured, reportType is set to eventTriggered, and IDC problems are detected when logging is performed as an event condition (out of coverage or eventL1) is satisfied, the UE may include InDeviceCoexDetected in a VarLogMeasReport variable and may log available measurement information. On the other hand, when reportInDeviceCoexDetected is not con- MeasConfig) or a current serving cell is included in a cell indicated by areaConfig of areaConfiguration in VarLogMeasConfig (if the serving cell is part of the area indicated by areaConfig in areaConfiguration in VarLogMeasConfig)

the UE may periodically perform logging at regular time intervals, as defined by loggingInterval in Var- LogMeasConfig (perform the logging at regular time intervals, as defined by the loggingInterval in the VarLogMeasConfig)

else if the UE is in any cell selection state defined in TS 38.304 (else if the UE is in any cell selection state as specified in TS 38.304), the UE may periodically perform logging at regular time intervals, as defined by loggingInterval in VarLogMeasConfig (perform the logging at regular time intervals, as defined by the loggingInterval in the VarLogMeasConfig)

In operation 1h-55, when the UE attempts to add a logged measurement entry to the VarLogMeasReport variable, the UE may determine whether IDC problems are detected during a last logging interval.

When the IDC problems are detected during the last logging interval ('YES' in operation 1h-55), in operation 1h-60, the UE may include inDeviceCoexDetected in the VarLogMeasReport variable, and may suspend measurement logging in a next logging interval. Then, the UE may perform operation 1h-35.

When the IDC problems are not detected during the last logging interval ('NO' in operation 1h-55), in operation 1h-65, the UE may log available measurement information. When logging the available measurement information, the UE may perform a procedure below, and may perform operation 1h-35.

the UE may set relativeTimeStamp to indicate an elapsed time after logged measurement configuration was received (set the relativeTimeStamp to indicate the elapsed time since the moment at which the logged measurement configuration was received)

if detailed location information became available during a last logging interval, the UE may set content of locationInfo as in 5.3.3.7 of TS 38.331 (if detailed location information became available during the last logging interval, set the content of the locationInfo as in 5.3.3.7 in TS 38.331)

if the UE is in any cell selection state as defined in TS 38.304 (if the UE is in any cell selection state as specified in TS 38.304):

the UE may set anyCellSelectionDetected to indicate that a suitable or acceptable cell is not detected (set anyCellSelectionDetected to indicate the detection of no suitable or no acceptable cell found)

the UE may set servCellIdentity to indicate global cell identity of a last logged cell on which the UE was camping (set the servCellIdentity to indicate global cell identity of the last logged cell that the UE was camping on)

the UE may set measResultServingCell to include quantities of the last logged cell on which the UE was camping (set the measResultServingCell to include the quantities of the last logged cell the UE was camping on)

else (that is, if the UE is not in any cell selection state):

the UE may set servCellIdentity to indicate global cell identity of a cell on which the UE is camping (set the servCellIdentity to indicate global cell identity of the cell the UE is camping on)

the UE may set measResultServingCell to include quantities of the cell on which the UE is camping (set the measResultServingCell to include the quantities of the cell the UE is camping on)

If available, the UE may set measResultNeighCells, in order of decreasing ranking-criterion as used for cell reselection, to include neighbouring cell measurement that became available during a last logging interval for at most the following number of neighbouring cells: 6 intra-frequency and 3 inter-frequency neighbors per frequency as well as 3 inter-RAT neighbours, per frequency. The UE may set frequencies per RAT and according to the following (if available, set the measResultNeighCells, in order of decreasing ranking-criterion as used for cell reselection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies per RAT and according to the following).

For each included neighbour cell, the UE may include optional fields that are available (for each neighbour cell included, include the optional fields that are available)

when a memory reserved for logged measurement information is full, the UE may stop timer T330 and may perform the same task as performed when timer T330 expires, as defined in 5.5a.1.4 of TS 38.331 (when the memory reserved for the logged measurement information becomes full, stop timer T330 and perform the same actions as performed upon expiry of T330, as specified in 5.5a.1.4 in TS 38.331.).

FIG. 1Hc is a flowchart of operations performed by the UE after the UE determines that reportType is set to event-Triggered in the VarLogMeasConfig variable in operation 1h-30 of FIG. 1Ha.

When the UE determines that reportType is set to event-Triggered in the VarLogMeasConfig variable in operation 1h-30 of FIG. 1Ha, referring to FIG. 1Hc, in operation 1h-70, the UE may perform measurement logging. In operation 1h-70, the UE may perform a procedure below.

Else if reportType is set to eventTriggered in the VarLogMeasConfig variable and eventType is set to OutOfCoverage (else if the reportType is set to eventTriggered and eventType is set to OutofCoverage)

the UE may periodically perform logging at regular time intervals, as defined by loggingInterval in VarLogMeasConfig only when the UE is in any cell selection state (perform the logging at regular time intervals, as defined by the loggingInterval in the VarLogMeasConfig only when the UE is in any cell selection state)

the UE may immediately perform logging as soon as the UE transitions from any cell selection state to a camped normally state (perform the logging immediately upon transitioning from the any cell selection state to the camped normally state)

else if reportType is set to eventTriggered and eventType is set to eventL1 in the VarLogMeasConfig variable (else if the reportType is set to eventTriggered and eventType is set to eventL1)

if the UE is in a camped normally state on an NR cell, and an RPLMN is included in plmn-IdentityList stored in VarLogMeasReport (if the UE is camping normally on an NR cell and if the RPLMN is included in plmn-IdentityList stored in VarLogMeasReport and) and if areaConfiguration is not included in VarLogMeasConfig (if areaConfiguration is not included in VarLogMeasConfig) or if a current serving cell is included in a cell indicated by areaConfig of areaConfiguration in VarLogMeasConfig (if the serving cell is part of the area indicated by areaConfig in areaConfiguration in VarLogMeasConfig)

the UE may periodically perform logging at regular time intervals, as defined by loggingInterval in Var-LogMeasConfig only when conditions indicated by eventL1 are satisfied (perform the logging at regular time intervals, as defined by the loggingInterval in the VarLogMeasConfig)

In operation 1h-75, the UE may determine whether IDC problems are detected in a last logging interval.

When the IDC problems are detected in the last logging interval ('YES' in operation 1h-75), and reportInDeviceCoexDetected is set in operation 1h-10, in operation 1h-80, the UE may include inDeviceCoexDetected in the VarLogMeasReport variable and may perform operation 1h-85. When the IDC problems are not detected in the last logging interval ('NO' in operation 1h-75) or reportInDeviceCoexDetected is not set in operation 1h-10, the UE may perform operation 1h-85.

In operation 1h-85, the UE may log available measurement information. When logging the available measurement information, the UE may perform at least one of processes below, and may perform operation 1h-70.

The UE may set relativeTimeStamp to indicate an elapsed time after logged measurement configuration was received (set the relativeTimeStamp to indicate the elapsed time since the moment at which the logged measurement configuration was received)

if detailed location information became available during a last logging interval, the UE may set content of locationInfo as in 5.3.3.7 of TS 38.331 (if detailed location information became available during the last logging interval, set the content of the locationInfo as in 5.3.3.7 in TS 38.331)

if the UE is in any cell selection state as defined in TS 38.304 (if the UE is in any cell selection state as specified in TS 38.304):

the UE may set anyCellSelectionDetected to indicate that a suitable or acceptable cell is not detected (set anyCellSelectionDetected to indicate the detection of no suitable or no acceptable cell found)

the UE may set servCellIdentity to indicate global cell identity of a last logged cell on which the UE was camping (set the servCellIdentity to indicate global cell identity of the last logged cell that the UE was camping on)

the UE may set measResultServingCell to include quantities of the last logged cell on which the UE was camping (set the measResultServingCell to include the quantities of the last logged cell the UE was camping on)

else (that is, if the UE is not in any cell selection state):

the UE may set servCellIdentity to indicate global cell identity of a cell on which the UE is camping (set the servCellIdentity to indicate global cell identity of the cell the UE is camping on)

the UE may set measResultServingCell to include quantities of the cell on which the UE is camping (set the measResultServingCell to include the quantities of the cell the UE is camping on)

the UE may perform at least one of the following actions

Action 1: If available, the UE may set measResultNeighCells, in order of decreasing ranking-criterion as used for cell reselection, to include neighbouring cell measurement that became available during a last logging interval for at most the following number of neighbouring cells: 6 intra-frequency and 3 inter-frequency neighbours per frequency as well as 3 inter-RAT neighbours, per frequency. The UE may set frequencies per RAT and according to the following (if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies per RAT and according to the following)

For each included neighbor cell, the UE may include optional fields that are available (for each neighbour cell included, include the optional fields that are available)

Action 2: if the UE cannot detect IDC problems, if available, the UE may set the measResultNeighCells, in order of decreasing ranking-criterion as used for cell re-selection, to include neighboring cell measurements that became available during the last logging interval for at most the following number of neighboring cells: 6 intra-frequency and 3 inter-frequency neighbours per frequency as well as 3 inter-RAT neighbours, per frequency. The UE may set frequencies per RAT and according to the following (if the UE does not detect IDC problems, if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies per RAT and according to the following).

For each included neighbour cell, the UE may include optional fields that are available (for each neighbour cell included)

Action 3: the UE may include information about neighbouring frequency or cells that are affected by IDC problems (include the information which neighboring frequency or cells are affected by IDC problems)

when a memory reserved for logged measurement information is full, the UE may stop timer T330 and may perform the same task as performed when timer T330 expires, as defined in 5.5a.1.4 of TS 38.331 (when the memory reserved for the logged measurement information becomes full, stop timer T330 and perform the same actions as performed upon expiry of T330, as specified in 5.5a.1.4 in TS 38.331.).

The UE according to an embodiment of the present disclosure is characterized to log available measurement information by including InDeviceCoexDetected, when reportType is set to eventTriggered, an indicator indicating whether to include the InDeviceCoexDetected indicator is configured in the LoggedMeasurementConfiguration message, and IDC problems are detected when logging is performed as the event condition (out of coverage or eventL1) is satisfied.

Furthermore, when reportType is set to eventTriggered, an indicator indicating whether to include the InDeviceCoexDetected indicator is configured in the LoggedMeasurementConfiguration message even when the event condition is not satisfied, the UE according to an embodiment of the present disclosure may perform logging by including inDeviceCoexDetected when IDC problems are detected according to loggingInterval stored in VarLogMeasConfig. When performing logging, the UE may perform some or all operations among operations performed in operation 1*h*-85 described above.

Figure 1I:
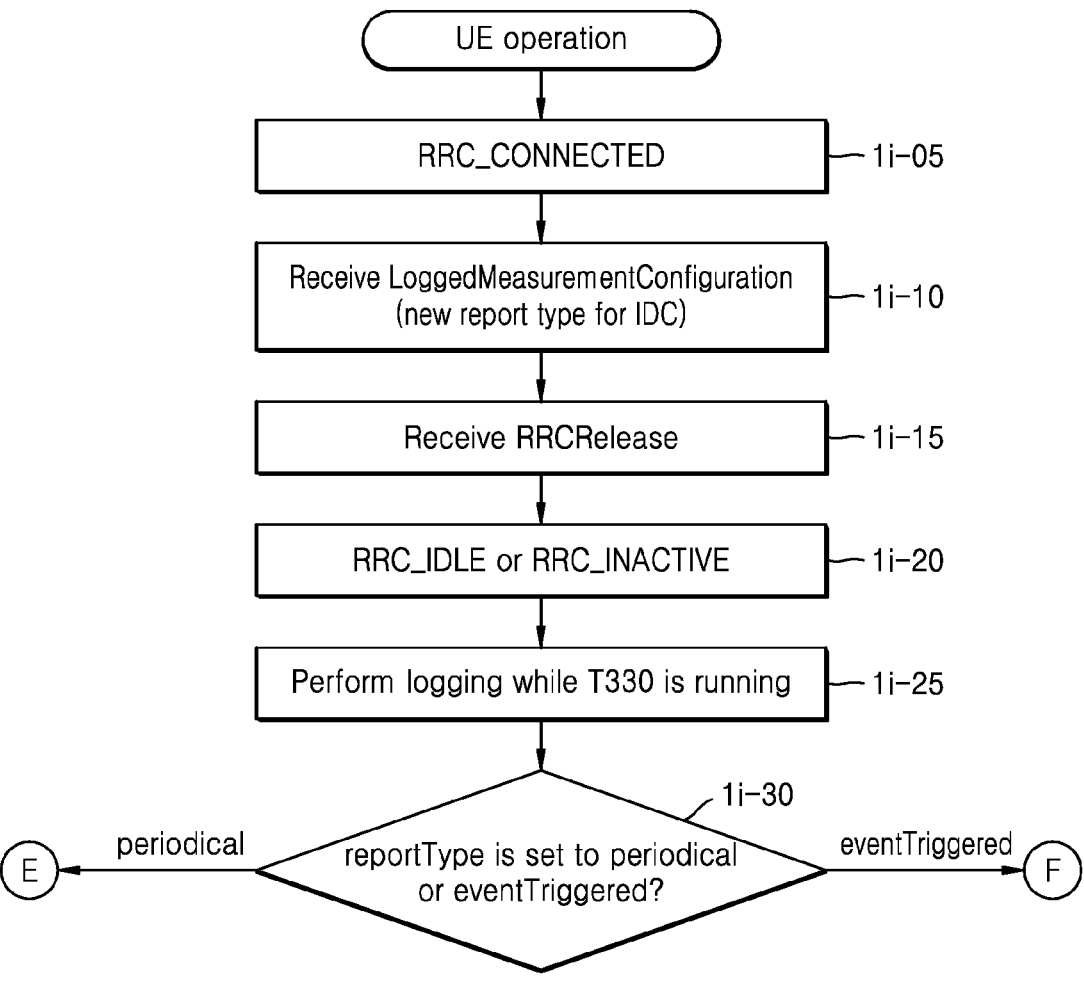
FIG. 1Ia is a flowchart of a UE performing measurement logging according to an embodiment of the present disclosure.
Figure 1I:
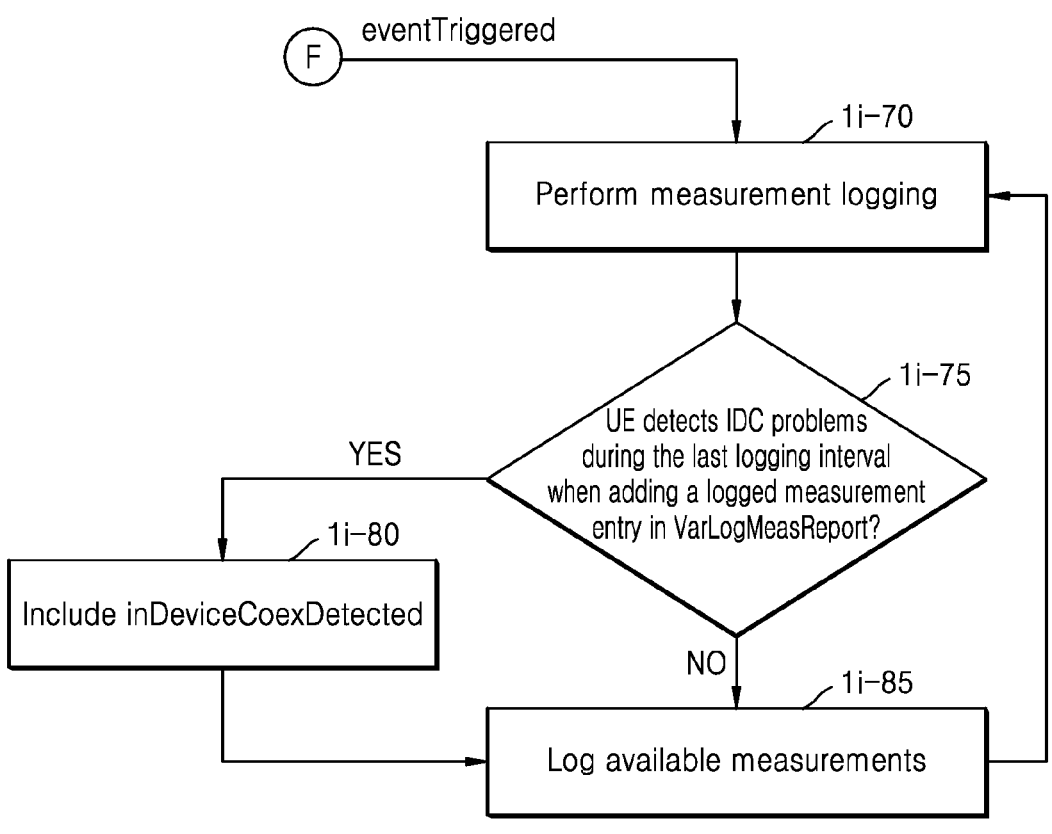

FIGS. 1Ia, 1Ib, and 1Ic are flowcharts of a UE performing measurement logging according to an embodiment of the present disclosure.

Referring to FIG. 1Ia, in operation 1*i*-05, the UE may establish RRC connection to an NR BS and thus may be in an RRC connected mode (RRC_CONNECTED).

In operation 1*i*-10, the UE in the RRC connected mode may receive a LoggedMeasurementConfiguration message from the NR BS. When the UE receives the LoggedMeasurementConfiguration message, the UE may apply the LoggedMeasurementConfiguration message according to the embodiment described above. An embodiment of the present disclosure proposes new reportType in the LoggedMeasurementConfiguration message. According to an embodiment of the present disclosure, it is proposed that, when reportType is set to eventTriggered, regardless of an event condition, a UE includes an InDeviceCoexDetected indicator according to a logging interval stored in VarLogMeasConfig when IDC problems are detected. For example, the new reportType may have a structure below.

When the UE determines that the detected IDC problems are resolved during the last logging interval ('YES' in operation 1*i*-40), in operation 1*i*-50, the UE may resume measurement logging. When the UE resumes measurement logging or determines that measurement logging is not suspended ('NO' in operation 1*i*-35), in operation 1*i*-50, the UE may perform measurement logging. In operation 1*i*-50, the UE may perform a procedure below.

If the UE is in a camped normally state on an NR cell and an RPLMN is included in plmn-IdentityList stored in VarLogMeasReport (if the UE is camping normally on an NR cell and if the RPLMN is included in plmn-IdentityList stored in VarLogMeasReport and) and if areaConfiguration is not included in VarLogMeasConfig (if areaConfiguration is not included in VarLogMeasConfig) or a current serving cell is included in a cell indicated by areaConfig of areaConfiguration in VarLogMeasConfig (if the serving cell is part of the area indicated by areaConfig in areaConfiguration in VarLogMeasConfig)

the UE may periodically perform logging at regular time intervals, as defined by loggingInterval in VarLogMeasConfig (perform the logging at regular time intervals, as defined by the loggingInterval in the VarLogMeasConfig)

else if the UE is in any cell selection state defined in TS 38.304 (else if the UE is in any cell selection state as specified in TS 38.304),

```
LoggedMeasurementConfiguration-v17xy-Ies          ::= SEQUENCE{
  reportType2                                     CHOICE{
    reportInDeviceCoexDetected      ENUMERATE    {TRUE}  OPTIONAL
    ...
  },
}
```

In operation 1*i*-15, the UE may receive an RRC connection release message (RRCRelease) from the NR BS.

In operation 1*i*-20, the UE may transition to an RRC idle mode (RRC_IDLE) or an RRC inactive mode (RRC_INACTIVE) according to the embodiment described above.

In operation 1*i*-25, the UE having transitioned to the RRC idle mode or the RRC inactive mode may perform logging if timer T330 is running.

In operation 1*i*-30, the UE may determine whether reportType is set to periodical or eventTriggered in the VarLogMeasConfig variable.

FIG. 1Ib is a flowchart of operations performed by the UE after the UE determines that reportType is set to periodical in the VarLogMeasConfig variable in operation 1*i*-30 of FIG. 1Ia.

When the UE determines that reportType is set to periodical in the VarLogMeasConfig variable in operation 1*i*-30 of FIG. 1Ia, referring to FIG. 1Ib, in operation 1*i*-35, the UE may determine whether measurement logging is suspended.

When the UE determines that measurement logging is suspended ('YES' in operation 1*i*-35), in operation 1*i*-40, the UE may determine whether IDC problems detected by the UE are resolved during a last logging interval.

When the UE determines that the detected IDC problems are not resolved during the last logging interval ('NO' in operation 1*i*-40), in operation 1*i*-45, the UE may continuously suspend measurement logging. Then, the UE may re-perform operation 1*i*-40.

the UE may periodically perform logging at regular time intervals, as defined by loggingInterval in VarLogMeasConfig (perform the logging at regular time intervals, as defined by the loggingInterval in the VarLogMeasConfig)

In operation 1*i*-55, when the UE attempts to add a logged measurement entry to the VarLogMeasReport variable, the UE may determine whether IDC problems are detected during a last logging interval.

When the IDC problems are detected during the last logging interval ('YES' in operation 1*i*-55), in operation 1*i*-60, the UE may include inDeviceCoexDetected in the VarLogMeasReport variable, and may suspend measurement logging in a next logging interval. Then, the UE may perform operation 1*i*-35.

When the IDC problems are not detected during the last logging interval ('NO' in operation 1*i*-55), in operation 1*i*-65, the UE may log available measurement information. When logging the available measurement information, the UE may perform a procedure below, and may perform operation 1*i*-35.

the UE may set relativeTimeStamp to indicate an elapsed time after logged measurement configuration was received (set the relativeTimeStamp to indicate the elapsed time since the moment at which the logged measurement configuration was received)

if detailed location information became available during a last logging interval, the UE may set content of locationInfo as in 5.3.3.7 of TS 38.331 (if detailed location information became available during the last logging interval, set the content of the locationInfo as in 5.3.3.7 in TS 38.331)

if the UE is in any cell selection state as defined in TS 38.304 (if the UE is in any cell selection state as specified in TS 38.304):

the UE may set anyCellSelectionDetected to indicate that a suitable or acceptable cell is not detected (set anyCellSelectionDetected to indicate the detection of no suitable or no acceptable cell found)

the UE may set servCellIdentity to indicate global cell identity of a last logged cell on which the UE was camping (set the servCellIdentity to indicate global cell identity of the last logged cell that the UE was camping on)

the UE may set measResultServingCell to include quantities of the last logged cell on which the UE was camping (set the measResultServingCell to include the quantities of the last logged cell the UE was camping on)

else (that is, if the UE is not in any cell selection state):

the UE may set servCellIdentity to indicate global cell identity of a cell on which the UE is camping (set the servCellIdentity to indicate global cell identity of the cell the UE is camping on)

the UE may set measResultServingCell to include quantities of the cell on which the UE is camping (set the measResultServingCell to include the quantities of the cell the UE is camping on)

If available, the UE may set measResultNeighCells, in order of decreasing ranking-criterion as used for cell reselection, to include neighbouring cell measurement that became available during a last logging interval for at most the following number of neighbouring cells: 6 intra-frequency and 3 inter-frequency neighbours per frequency as well as 3 inter-RAT neighbours, per frequency. The UE may set frequencies per RAT and according to the following (if available, set the measResultNeighCells, in order of decreasing ranking-criterion as used for cell reselection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies per RAT and according to the following)

For each included neighbour cell, the UE may include optional fields that are available (for each neighbour cell included, include the optional fields that are available)

when a memory reserved for logged measurement information is full, the UE may stop timer T330 and may perform the same task as performed when timer T330 expires, as defined in 5.5a.1.4 of TS 38.331 (when the memory reserved for the logged measurement information becomes full, stop timer T330 and perform the same actions as performed upon expiry of T330, as specified in 5.5a.1.4 in TS 38.331.).

FIG. 1Ic is a flowchart of operations performed by the UE after the UE determines that reportType is set to eventTriggered in the VarLogMeasConfig variable in operation 1*i*-30 of FIG. 1Ia.

When the UE determines that reportType is set to event-Triggered in the VarLogMeasConfig variable in operation 1*i*-30 of FIG. 1Ia, referring to FIG. 1Ic, in operation 1*i*-70, the UE may perform measurement logging. That is, in operation 1*i*-70, the UE may perform a procedure below.

Else if reportType is set to eventTriggered in the VarLog-MeasConfig variable and eventType is set to OutOf-Coverage (else if the reportType is set to eventTriggered and eventType is set to OutofCoverage)

the UE may periodically perform logging at regular time intervals, as defined by loggingInterval in Var-LogMeasConfig only when the UE is in any cell selection state (perform the logging at regular time intervals, as defined by the loggingInterval in the VarLogMeasConfig only when the UE is in any cell selection state)

the UE may immediately perform logging as soon as the UE transitions from any cell selection state to a camped normally state (perform the logging immediately upon transitioning from the any cell selection state to the camped normally state)

else if reportType is set to eventTriggered and eventType is set to eventL1 in the VarLogMeasConfig variable (else if the reportType is set to eventTriggered and eventType is set to eventL1)

if the UE is in a camped normally state on an NR cell, and an RPLMN is included in plmn-IdentityList stored in VarLogMeasReport (if the UE is camping normally on an NR cell and if the RPLMN is included in plmn-IdentityList stored in VarLogMeas-Report and) and if areaConfiguration is not included in VarLogMeasConfig (if areaConfiguration is not included in VarLogMeasConfig) or if a current serving cell is included in a cell indicated by areaConfig of areaConfiguration in VarLogMeasConfig (if the serving cell is part of the area indicated by areaConfig in areaConfiguration in VarLogMeasConfig)

the UE may periodically perform logging at regular time intervals, as defined by loggingInterval in VarLogMeasConfig only when conditions indicated by eventL1 are satisfied (perform the logging at regular time intervals, as defined by the loggingInterval in the VarLogMeasConfig)

if reportType is set to eventTriggered in the VarLog-MeasConfig variable and new reportType2 is set In operation 1*i*-75, the UE may determine whether IDC problems are detected in a last logging interval.

When the IDC problems are detected in the last logging interval ('YES' in operation 1*i*-75), and new reportType2 is set in operation 1*i*-10, in operation 1*i*-80, the UE may include inDeviceCoexDetected in the VarLogMeasReport variable and may perform operation 1*i*-85. When the IDC problems are not detected in the last logging interval ('NO' in operation 1*i*-75) or new reportType2 is not set in operation 1*i*-10, the UE may perform operation 1*i*-85.

In operation 1*i*-85, the UE may log available measurement information. When logging the available measurement information, the UE may perform at least one of processes below, and may perform operation 1*i*-70.

The UE may set relativeTimeStamp to indicate an elapsed time after logged measurement configuration was received (set the relativeTimeStamp to indicate the elapsed time since the moment at which the logged measurement configuration was received)

if detailed location information became available during a last logging interval, the UE may set content of locationInfo as in 5.3.3.7 of TS 38.331 (if detailed location information became available during the last logging interval, set the content of the locationInfo as in 5.3.3.7 in TS 38.331)

31 if the UE is in any cell selection state as defined in TS 38.304 (if the UE is in any cell selection state as specified in TS 38.304):

the UE may set anyCellSelectionDetected to indicate that a suitable or acceptable cell is not detected (set anyCellSelectionDetected to indicate the detection of no suitable or no acceptable cell found)

the UE may set servCellIdentity to indicate global cell identity of a last logged cell on which the UE was camping (set the servCellIdentity to indicate global cell identity of the last logged cell that the UE was camping on)

the UE may set measResultServingCell to include quantities of the last logged cell on which the UE was camping (set the measResultServingCell to include the quantities of the last logged cell the UE was camping on)

else (that is, if the UE is not in any cell selection state):

the UE may set servCellIdentity to indicate global cell identity of a cell on which the UE is camping (set the servCellIdentity to indicate global cell identity of the cell the UE is camping on)

the UE may set measResultServingCell to include quantities of the cell on which the UE is camping (set the measResultServingCell to include the quantities of the cell the UE is camping on)

the UE may perform at least one of the following actions

Action 1: If available, the UE may set measResult-NeighCells, in order of decreasing ranking-criterion as used for cell reselection, to include neighbouring cell measurement that became available during a last logging interval for at most the following number of neighbouring cells: 6 intra-frequency and 3 inter-frequency neighbours per frequency as well as 3 inter-RAT neighbours, per frequency. The UE may set frequencies per RAT and according to the following (if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies per RAT and according to the following)

For each included neighbor cell, the UE may include optional fields that are available (for each neighbour cell included, include the optional fields that are available)

Action 2: if the UE cannot detect IDC problems, if available, the UE may set the measResultNeigh-Cells, in order of decreasing ranking-criterion as used for cell re-selection, to include neighboring cell measurements that became available during the last logging interval for at most the following number of neighboring cells: 6 intra-frequency and 3 inter-frequency neighbours per frequency as well as 3 inter-RAT neighbours, per frequency. The UE may set frequencies per RAT and according to the following (if the UE does not detect IDC problems, if available, set the measResultNeigh-Cells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies per RAT and according to the following)

For each included neighbour cell, the UE may include optional fields that are available (for each neighbour cell included)

Action 3: the UE may include information which neighbouring frequency or cells are affected by IDC problems (include the information which neighboring frequency or cells are affected by IDC problems)

when a memory reserved for logged measurement information is full, the UE may stop timer T330 and may perform the same task as performed when timer T330 expires, as defined in 5.5a.1.4 of TS 38.331 (when the memory reserved for the logged measurement information becomes full, stop timer T330 and perform the same actions as performed upon expiry of T330, as specified in 5.5a.1.4 in TS 38.331.).

The UE according to an embodiment of the present disclosure is characterized to log available measurement information by including InDeviceCoexDetected, when reportType is set to eventTriggered and new reportType2 is set in the LoggedMeasurementConfiguration message, even when IDC problems are detected without an event condition (Out of coverage or eventL1) being satisfied. If IDC problems are detected when the event condition (Out of coverage or eventL1) is satisfied, the UE may be characterized to log available measurement information by always including InDeviceCoexDetected or may be characterized to log available measurement information by including InDeviceCoexDetected only when new reportType2 is set.

Figure 1J:
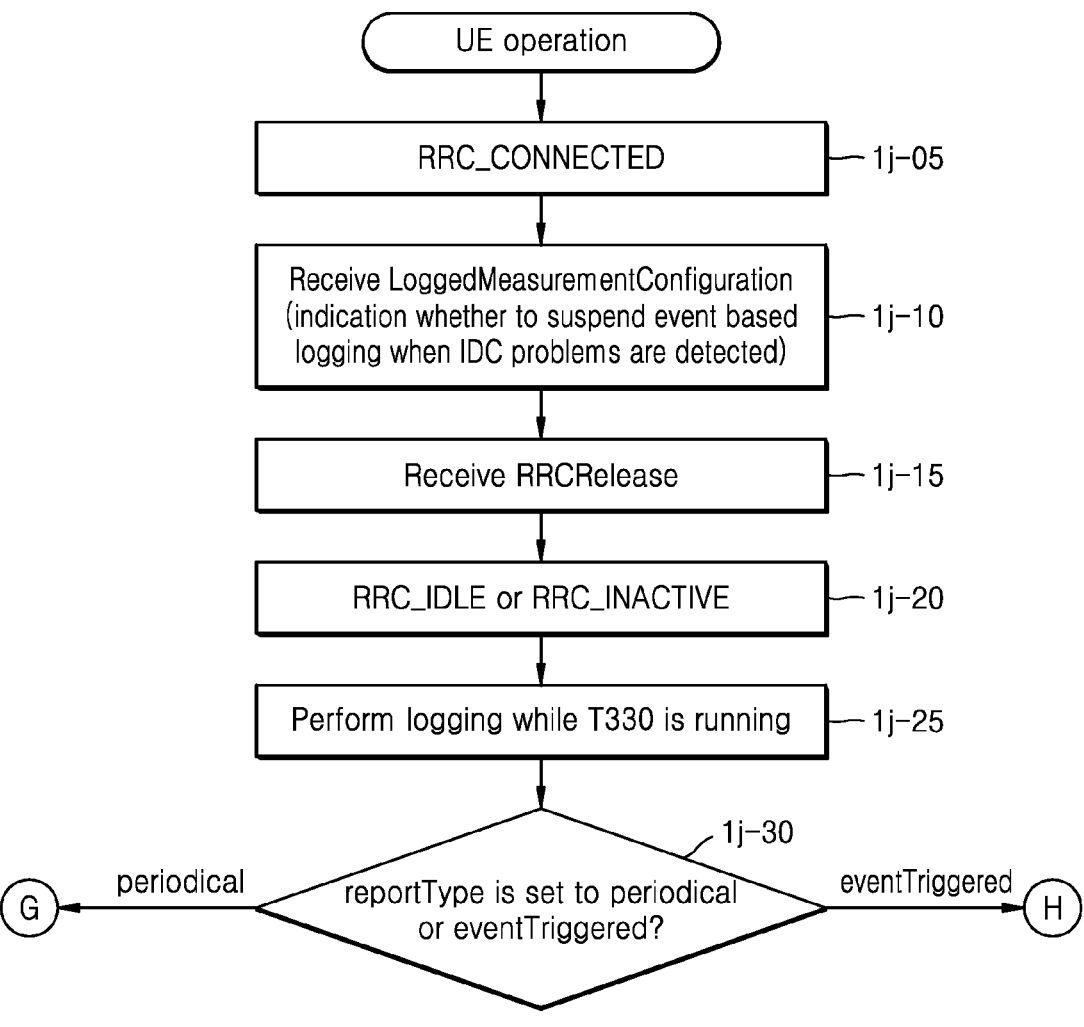
FIG. 1Ja is a flowchart of a UE performing measurement logging according to an embodiment of the present disclosure.
Figure 1J:
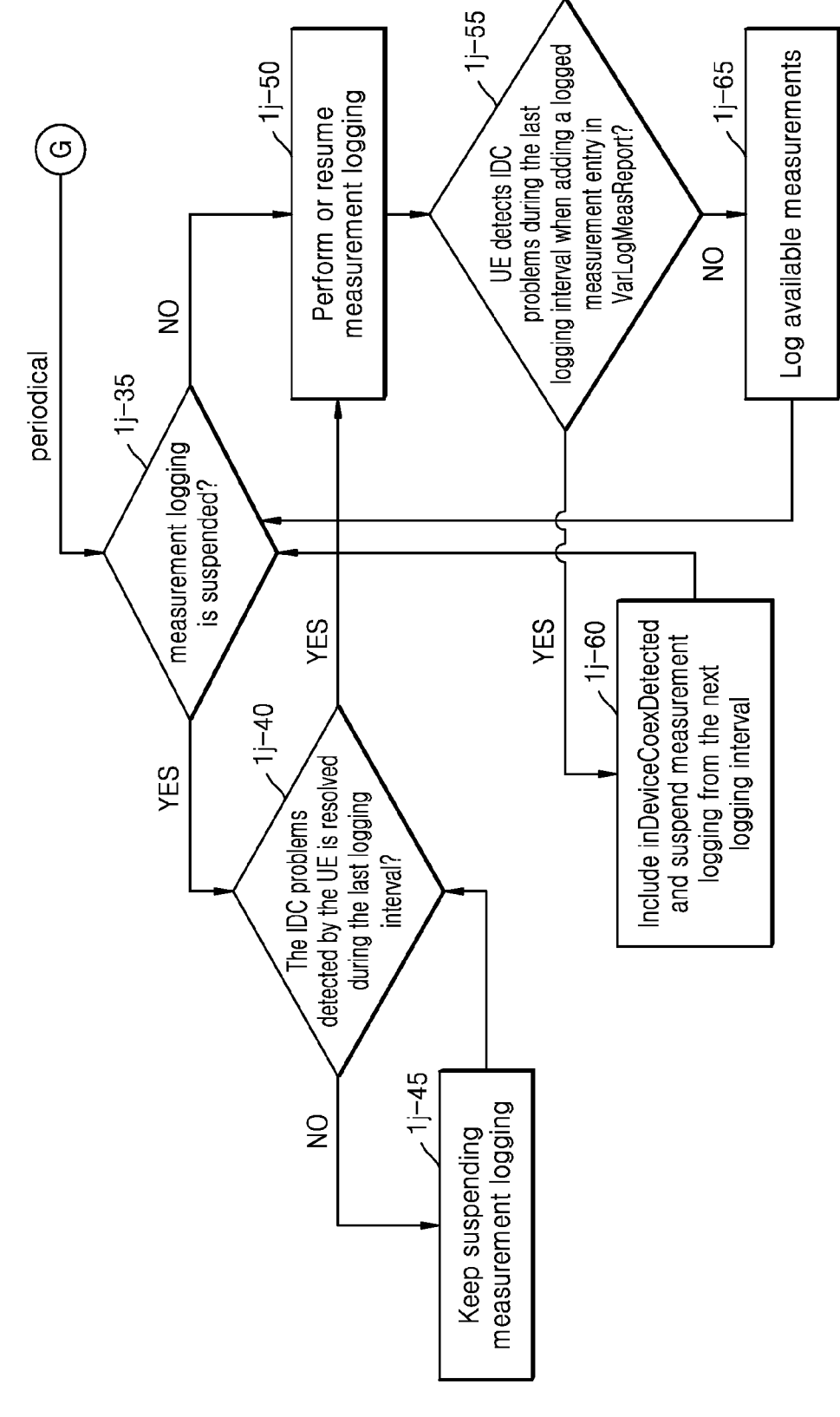
Figure 1J:
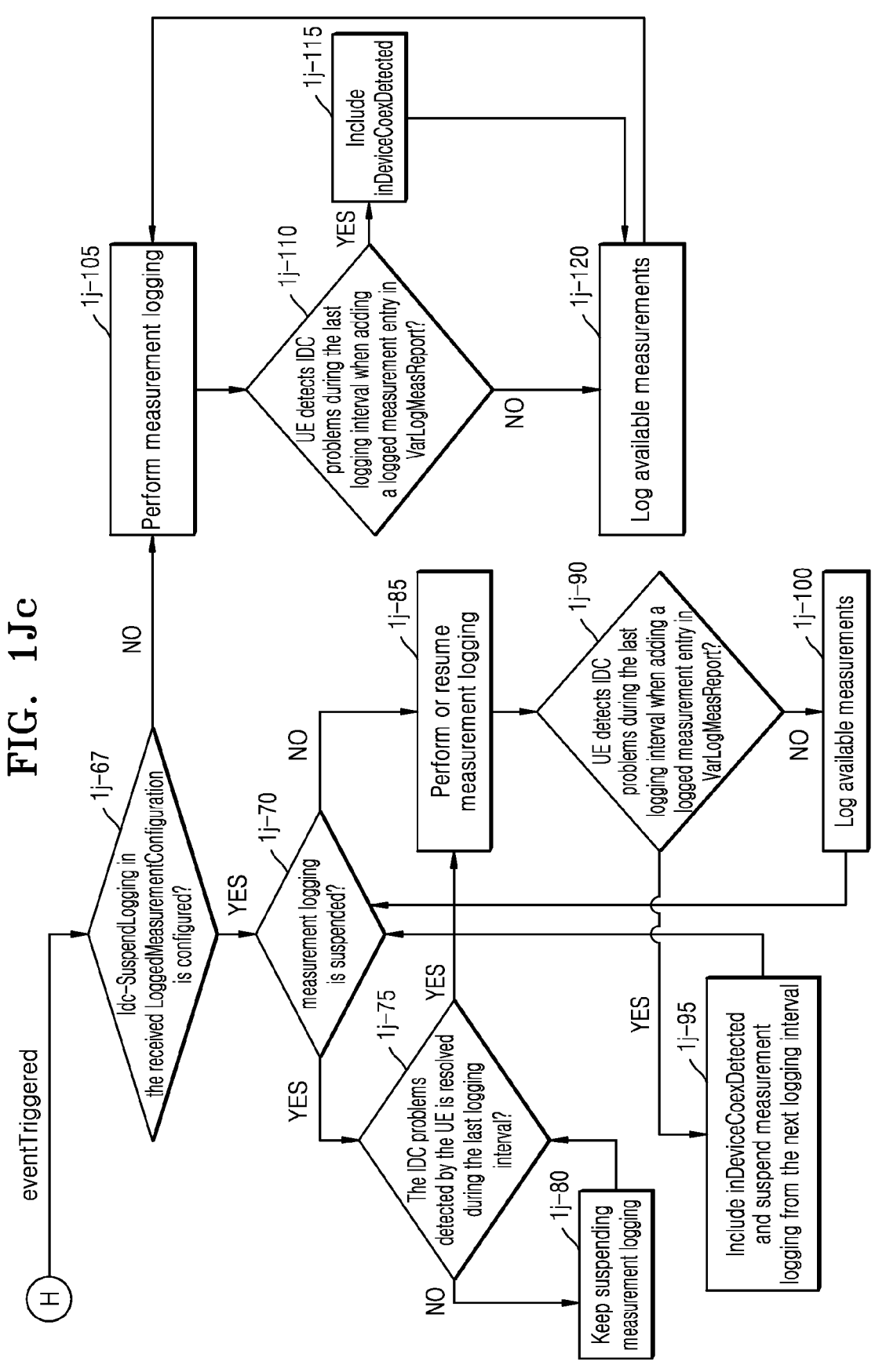

FIGS. 1Ja, 1Jb, and 1Jc are flowcharts of a UE performing measurement logging according to an embodiment of the present disclosure.

Referring to FIG. 1Ja, in operation 1*j*-05, the UE may establish RRC connection to an NR BS and thus may be in an RRC connected mode (RRC_CONNECTED).

In operation 1*j*-10, the UE in the RRC connected mode may receive a LoggedMeasurementConfiguration message from the NR BS. When the UE receives the LoggedMeasurementConfiguration message, the UE may apply the LoggedMeasurementConfiguration message according to the embodiment described above. An embodiment of the present disclosure proposes that an indicator (idc-Suspend-Logging) indicating whether to suspend measurement logging when IDC problems exist if an event condition is satisfied is included in a LoggedMeasurementConfiguration message. For example, the indicator (idc-SuspendLogging) indicating whether to suspend measurement logging when IDC problems exist if an event condition is satisfied may have a structure below.

```
LoggedEventTriggerConfig-r16 ::=    SEQUENCE {
    eventType-r16                       EventType-r16,
    loggingInterval-r16                 LoggingInterval-r16,
```

-continued

```
...,
[[ idc-SuspendLogging          ENUMERATE  {TRUE}  OPTIONAL
]]
}
```

In operation 1j-15, the UE may receive an RRC connection release message (RRCRelease) from the NR BS.

In operation 1j-20, the UE may transition to an RRC idle mode (RRC_IDLE) or an RRC inactive mode (RRC_INACTIVE) according to the embodiment described above.

In operation 1j-25, the UE having transitioned to the RRC idle mode or the RRC inactive mode may perform logging if timer T330 is running.

In operation 1j-30, the UE may determine whether report-Type is set to periodical or eventTriggered in the VarLog-MeasConfig variable.

FIG. 1Jb is a flowchart of operations performed by the UE after the UE determines that reportType is set to periodical in the VarLogMeasConfig variable in operation 1j-30 of FIG. 1Ja.

When the UE determines that reportType is set to periodical in the VarLogMeasConfig variable in operation 1j-30 of FIG. 1Ja, referring to FIG. 1Jb, in operation 1j-35, the UE may determine whether measurement logging is suspended.

When the UE determines that measurement logging is suspended ('YES' in operation 1j-35), in operation 1j-40, the UE may determine whether IDC problems detected by the UE are resolved during a last logging interval.

When the UE determines that the detected IDC problems are not resolved during the last logging interval ('NO' in operation 1j-40), in operation 1j-45, the UE may continuously suspend measurement logging. Then, the UE may re-perform operation 1j-40.

When the UE determines that the detected IDC problems are resolved during the last logging interval ('YES' in operation 1j-40), in operation 1j-50, the UE may resume measurement logging. When the UE resumes measurement logging or determines that measurement logging is not suspended ('NO' in operation 1j-35), in operation 1j-50, the UE may perform measurement logging. In operation 1j-50, the UE may perform a procedure below.

If the UE is in a camped normally state on an NR cell and an RPLMN is included in plmn-IdentityList stored in VarLogMeasReport (if the UE is camping normally on an NR cell and if the RPLMN is included in plmn-IdentityList stored in VarLogMeasReport and) and if areaConfiguration is not included in VarLogMeasConfig (if areaConfiguration is not included in VarLog-MeasConfig) or a current serving cell is included in a cell indicated by areaConfig of areaConfiguration in VarLogMeasConfig (if the serving cell is part of the area indicated by areaConfig in areaConfiguration in VarLogMeasConfig)

the UE may periodically perform logging at regular time intervals, as defined by loggingInterval in Var-LogMeasConfig (perform the logging at regular time intervals, as defined by the loggingInterval in the VarLogMeasConfig)

else if the UE is in any cell selection state defined in TS 38.304 (else if the UE is in any cell selection state as specified in TS 38.304), the UE may periodically perform logging at regular time intervals, as defined by loggingInterval in Var- LogMeasConfig (perform the logging at regular time intervals, as defined by the loggingInterval in the VarLogMeasConfig)

In operation 1j-55, when the UE attempts to add a logged measurement entry to the VarLogMeasReport variable, the UE may determine whether IDC problems are detected during a last logging interval.

When the IDC problems are detected during the last logging interval ('YES' in operation 1j-55), in operation 1j-60, the UE may include inDeviceCoexDetected in the VarLogMeasReport variable, and may suspend measurement logging in a next logging interval. Then, the UE may perform operation 1j-35.

When the IDC problems are not detected during the last logging interval ('NO' in operation 1j-55), in operation 1j-65, the UE may log available measurement information. When logging the available measurement information, the UE may perform a procedure below, and may perform operation 1j-35.

the UE may set relativeTimeStamp to indicate an elapsed time after logged measurement configuration was received (set the relativeTimeStamp to indicate the elapsed time since the moment at which the logged measurement configuration was received)

if detailed location information became available during the last logging interval, the UE may set the content of the locationInfo as in 5.3.3.7 in TS 38.331 (if detailed location information became available during the last logging interval, set the content of the locationInfo as in 5.3.3.7 in TS 38.331)

if the UE is in any cell selection state as defined in TS 38.304 (if the UE is in any cell selection state as specified in TS 38.304):

the UE may set anyCellSelectionDetected to indicate that a suitable or acceptable cell is not detected (set anyCellSelectionDetected to indicate the detection of no suitable or no acceptable cell found)

the UE may set servCellIdentity to indicate global cell identity of a last logged cell on which the UE was camping (set the servCellIdentity to indicate global cell identity of the last logged cell that the UE was camping on)

the UE may set measResultServingCell to include quantities of the last logged cell on which the UE was camping (set the measResultServingCell to include the quantities of the last logged cell the UE was camping on)

else (that is, if the UE is not in any cell selection state):

the UE may set servCellIdentity to indicate global cell identity of a cell on which the UE is camping (set the servCellIdentity to indicate global cell identity of the cell the UE is camping on)

the UE may set measResultServingCell to include quantities of the cell on which the UE is camping (set the measResultServingCell to include the quantities of the cell the UE is camping on)

If available, the UE may set measResultNeighCells, in order of decreasing ranking-criterion as used for cell reselection, to include neighbouring cell measurement that became available during a last logging interval for at most the following number of neighbouring cells: 6 intra-frequency and 3 inter-frequency neighbours per frequency as well as 3 inter-RAT neighbours, per frequency. The UE may set frequencies per RAT and according to the following (if available, set the measResultNeighCells, in order of decreasing ranking-criterion as used for cell reselection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies per RAT and according to the following)

For each included neighbour cell, the UE may include optional fields that are available (for each neighbour cell included, include the optional fields that are available)

when a memory reserved for logged measurement information is full, the UE may stop timer T330 and may perform the same task as performed when timer T330 expires, as defined in 5.5a.1.4 of TS 38.331 (when the memory reserved for the logged measurement information becomes full, stop timer T330 and perform the same actions as performed upon expiry of T330, as specified in 5.5a.1.4 in TS 38.331.).

FIG. 1Jc is a flowchart of operations performed by the UE after the UE determines that reportType is set to eventTriggered in the VarLogMeasConfig variable in operation 1j-30 of FIG. 1Ja.

When the UE determines that reportType is set to eventTriggered in the VarLogMeasConfig variable in operation 1j-30 of FIG. 1Ja, referring to FIG. 1Jc, in operation 1j-67, the UE may determine whether an idc-suspendLogging indicator is configured in LoggedMeasurementConfiguration received in operation 1j-10. If the idc-suspendLogging indicator is configured ('YES' in operation 1j-67), the UE may perform operation 1j-70 as the UE is characterized to suspend measurement logging.

When it is determined that measurement logging is suspended ('YES' in operation 1j-70), in operation 1j-75, the UE may determine whether detected IDC problems are resolved in a last logging interval.

When it is determined that the detected IDC problems are not resolved in the last logging interval ('NO' in operation 1j-75), in operation 1j-80, the UE may continuously suspend measurement logging. Then, the UE may re-perform operation 1j-75.

When it is determined that the detected IDC problems are resolved in the last logging interval ('YES' in operation 1j-75), in operation 1j-85, the UE may resume measurement logging. When the UE resumes measurement logging or determines that measurement logging is not suspended ('NO' in operation 1j-70), in operation 1j-85, the UE may perform measurement logging. That is, in operation 1j-85, the UE may perform a procedure below.

Else if reportType is set to eventTriggered in the VarLogMeasConfig variable and eventType is set to OutOfCoverage (else if the reportType is set to eventTriggered and eventType is set to OutofCoverage)

the UE may periodically perform logging at regular time intervals, as defined by loggingInterval in VarLogMeasConfig only when the UE is in any cell selection state (perform the logging at regular time intervals, as defined by the loggingInterval in the VarLogMeasConfig only when the UE is in any cell selection state)

the UE may immediately perform logging as soon as the UE transitions from any cell selection state to a camped normally state (perform the logging immediately upon transitioning from the any cell selection state to the camped normally state)

else if reportType is set to eventTriggered and eventType is set to eventL1 in the VarLogMeasConfig variable (else if the reportType is set to eventTriggered and eventType is set to eventL1)

if the UE is in a camped normally state on an NR cell, and an RPLMN is included in plmn-IdentityList stored in VarLogMeasReport (if the UE is camping normally on an NR cell and if the RPLMN is included in plmn-IdentityList stored in VarLogMeasReport and) and if areaConfiguration is not included in VarLogMeasConfig (if areaConfiguration is not included in VarLogMeasConfig) or if a current serving cell is included in a cell indicated by areaConfig of areaConfiguration in VarLogMeasConfig (if the serving cell is part of the area indicated by areaConfig in areaConfiguration in VarLogMeasConfig)

the UE may periodically perform logging at regular time intervals, as defined by loggingInterval in VarLogMeasConfig only when conditions indicated by eventL1 are satisfied (perform the logging at regular time intervals, as defined by the loggingInterval in the VarLogMeasConfig)

In operation 1j-90, when the UE attempts to add a logged measurement entry to the VarLogMeasReport variable, the UE may determine whether IDC problems are detected during a last logging interval.

When the IDC problems are detected during the last logging interval ('YES' in operation 1j-90), in operation 1j-95, the UE may include inDeviceCoexDetected in the VarLogMeasReport variable, and may suspend measurement logging in a next logging interval. Then, the UE may re-perform operation 1j-70.

When the IDC problems are not detected during the last logging interval ('NO' in operation 1j-90), in operation 1j-100, the UE may log available measurement information. That is, when the UE logs available measurement information, the UE may perform at least one of processes below and may perform operation 1j-70.

the UE may set relativeTimeStamp to indicate an elapsed time after logged measurement configuration was received (set the relativeTimeStamp to indicate the elapsed time since the moment at which the logged measurement configuration was received)

if detailed location information became available during a last logging interval, the UE may set content of locationInfo as in 5.3.3.7 of TS 38.331 (if detailed location information became available during the last logging interval, set the content of the locationInfo as in 5.3.3.7 in TS 38.331)

if the UE is in any cell selection state as defined in TS 38.304 (if the UE is in any cell selection state as specified in TS 38.304):

the UE may set anyCellSelectionDetected to indicate that a suitable or acceptable cell is not detected (set anyCellSelectionDetected to indicate the detection of no suitable or no acceptable cell found)

the UE may set servCellIdentity to indicate global cell identity of a last logged cell on which the UE was camping (set the servCellIdentity to indicate global cell identity of the last logged cell that the UE was camping on)

the UE may set measResultServingCell to include quantities of the last logged cell on which the UE was camping (set the measResultServingCell to include the quantities of the last logged cell the UE was camping on)

else (that is, if the UE is not in any cell selection state):

the UE may set servCellIdentity to indicate global cell identity of a cell on which the UE is camping (set the servCellIdentity to indicate global cell identity of the cell the UE is camping on)

the UE may set measResultServingCell to include quantities of the cell on which the UE is camping (set the measResultServingCell to include the quantities of the cell the UE is camping on)

the UE may perform at least one of the following actions

Action 1: If available, the UE may set measResult-NeighCells, in order of decreasing ranking-criterion as used for cell reselection, to include neighbouring cell measurement that became available during a last logging interval for at most the following number of neighbouring cells: 6 intra-frequency and 3 inter-frequency neighbours per frequency as well as 3 inter-RAT neighbours, per frequency. The UE may set frequencies per RAT and according to the following (if available, set the measResultNeighCells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies per RAT and according to the following)

For each included neighbor cell, the UE may include optional fields that are available (for each neighbour cell included, include the optional fields that are available)

Action 2: if the UE cannot detect IDC problems, if available, the UE may set the measResultNeigh-Cells, in order of decreasing ranking-criterion as used for cell re-selection, to include neighboring cell measurements that became available during the last logging interval for at most the following number of neighboring cells: 6 intra-frequency and 3 inter-frequency neighbours per frequency as well as 3 inter-RAT neighbours, per frequency. The UE may set frequencies per RAT and according to the following (if the UE does not detect IDC problems, if available, set the measResultNeigh-Cells, in order of decreasing ranking-criterion as used for cell re-selection, to include neighbouring cell measurements that became available during the last logging interval for at most the following number of neighbouring cells: 6 intra-frequency and 3 inter-frequency neighbours per frequency as well as 3 inter-RAT neighbours, per frequency/set of frequencies per RAT and according to the following)

For each included neighbour cell, the UE may include optional fields that are available (for each neighbour cell included)

Action 3: the UE may include information about neighbouring frequency or cells that are affected by IDC problems (include the information which neighboring frequency or cells are affected by IDC problems)

when a memory reserved for logged measurement information is full, the UE may stop timer T330 and may perform the same task as performed when timer T330 expires, as defined in 5.5a.1.4 of TS 38.331 (when the memory reserved for the logged measurement information becomes full, stop timer T330 and perform the same actions as performed upon expiry of T330, as specified in 5.5a.1.4 in TS 38.331).

When the UE determines that reportType is set to event-Triggered in the VarLogMeasConfig variable in operation 1*j*-30 of FIG. 1Ja, referring to FIG. 1Jc, in operation 1*j*-67, the UE may determine whether an idc-suspendLogging indicator is configured in LoggedMeasurementConfiguration received in operation 1*j*-10. If the idc-suspendLogging indicator is configured ('NO' in operation 1*j*-67), the UE may perform operation 1*j*-105 as the UE is characterized to suspend measurement logging.

In operation 1*j*-105, the UE may perform measurement logging. The UE may perform measurement logging as in operation 1*j*-85.

In operation 1*j*-110, when the UE attempts to add a logged measurement entry to the VarLogMeasReport variable, the UE may determine whether IDC problems are detected during a last logging interval.

When the IDC problems are detected during the last logging interval ('YES' in operation 1*j*-110), in operation 1*j*-115, the UE may include inDeviceCoexDetected in the VarLogMeasReport variable. Then, in operation 1*j*-120, the UE may log available measurement information. The UE may log the available measurement information as in operation 1*j*-100. Then, the UE may perform operation 1*j*-105.

When the IDC problems are not detected during the last logging interval ('NO' in operation 1*j*-110), in operation 1*j*-120, the UE may log the available measurement information. The UE may log the available measurement information as in operation 1*j*-100. Then, the UE may perform operation 1*j*-105.

The UE according to an embodiment of the present disclosure is characterized to suspend event based measurement logging, when reportType is set to eventTriggered in LoggedMeasurementConfiguration and an indicator indicating to suspend measurement logging when an event is satisfied is included.

According to an embodiment of the present disclosure, a method performed by a UE in a wireless communication system may be provided. The method may include: receiving, from a BS, configuration information associated with logged MDT; and performing measurement logging in a plurality of logging intervals, based on the configuration information when the UE transitions to an idle state or an inactive state. The performing of the measurement logging may include: when reportType is set to eventTriggered, detecting whether an IDC problem has occurred in a last logging interval from among the plurality of logging intervals while the measurement logging is performed; and when it is detected that the IDC problem has occurred, logging a flag indicating the occurrence of the IDC problem.

According to an embodiment, the method may further include, when the UE transitions to a connected state, transmitting, to the BS, information obtained via the measurement logging.

According to an embodiment, the measurement logging may be performed when an event condition corresponding to eventType is satisfied.

According to an embodiment, the eventType may include out of coverage (OOC) or eventL1.

According to an embodiment, the logging of the flag may include adding the flag to a variable associated with the measurement logging.

According to an embodiment, the method may further include receiving the configuration information when the UE is in a connected state.

According to an embodiment, the method may further include, when the UE is in the connected state, receiving a connection release message from the BS, wherein the UE may transition to the idle state or the inactive state, based on the connection release message.

According to an embodiment, the measurement logging may be performed while a timer is running.

According to an embodiment of the present disclosure, a UE in a wireless communication system may be provided. The UE may include: a transceiver; and at least one processor coupled with the transceiver. The at least one processor may be configured to receive, from a BS, configuration information associated with logged MDT, and perform measurement logging in a plurality of logging intervals, based on the configuration information when the UE transitions to an idle state or an inactive state. The at least one processor may be further configured to, when reportType is set to eventTriggered, detect whether an IDC problem has occurred in a last logging interval from among the plurality of logging intervals while the measurement logging is performed, and when it is detected that the IDC problem has occurred, log a flag indicating the occurrence of the IDC problem.

According to an embodiment, the at least one processor may be further configured to, when the UE transitions to a connected state, transmit, to the BS, information obtained via the measurement logging.

According to an embodiment, the measurement logging may be performed when an event condition corresponding to eventType is satisfied.

According to an embodiment, the eventType may include out of coverage (OOC) or eventL1.

According to an embodiment, the at least one processor may be further configured to add the flag to a variable associated with the measurement logging.

According to an embodiment, the at least one processor may be further configured to receive the configuration information when the UE is in a connected state.

According to an embodiment, the at least one processor may be further configured to receive a connection release message from the BS when the UE is in the connected state, and the UE may transition to the idle state or the inactive state, based on the connection release message.

Figure 1K:
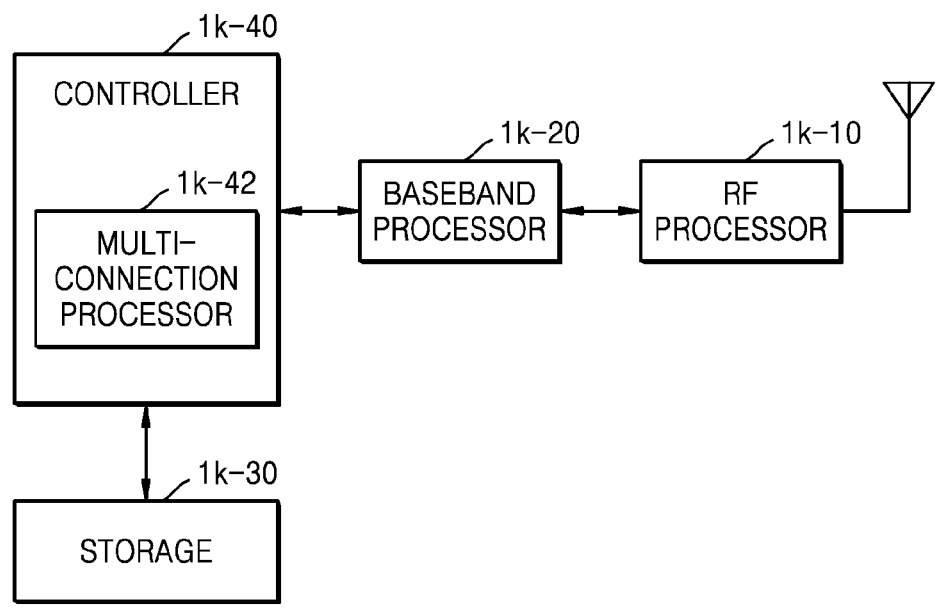
FIG. 1K is a block diagram illustrating an inner configuration of a UE according to an embodiment of the present disclosure.

FIG. 1K is a block diagram illustrating an inner configuration of a UE according to an embodiment of the present disclosure.

Referring to FIG. 1K, the UE may include a radio frequency (RF) processor 1*k*-10, a baseband processor 1*k*-20, a storage 1*k*-30, and a controller 1*k*-40. However, the UE is not limited to FIG. 1K, and may include fewer configurations or more configurations.

The RF processor 1*k*-10 may perform functions for transmitting and receiving signals via wireless channels, e.g., band conversion and amplification of the signals. That is, the RF processor 1*k*-10 may up-convert a baseband signal provided from the baseband processor 1*k*-20, into an RF band signal and then transmit the RF band signal via an antenna, and may down-convert an RF band signal received via the antenna, into a baseband signal. For example, the RF processor 1*k*-10 may include a transmit filter, a receive filter, an amplifier, a mixer, an oscillator, a digital-to-analog convertor (DAC), an analog-to-digital convertor (ADC), or the like. Although only one antenna is illustrated in FIG. 1K, the UE may include a plurality of antennas. Also, the RF processor 1*k*-10 may include a plurality of RF chains. Furthermore, the RF processor 1*k*-10 may perform beamforming. For the beamforming, the RF processor 1*k*-10 may adjust phases and intensities of respective signals that are transmitted or received via a plurality of antennas or antenna elements. Also, the RF processor 1*k*-10 may perform MIMO, and may receive a plurality of layers when performing an MIMO operation.

The baseband processor 1*k*-20 may perform conversion between a baseband signal and a bit string based on physical layer specifications of a system. For example, for data transmission, the baseband processor 1*k*-20 generates complex symbols by encoding and modulating a transmit bit string. For data reception, the baseband processor 1*k*-20 may reconstruct a received bit string by demodulating and decoding a baseband signal provided from the RF processor 1*k*-10. For example, according to an OFDM scheme, for data transmission, the baseband processor 1*k*-20 may generate complex symbols by encoding and modulating a transmit bit string, may map the complex symbols to subcarriers, and then may configure OFDM symbols by performing inverse fast Fourier transformation (IFFT) and inserting a cyclic prefix (CP). For data reception, the baseband processor 1*k*-20 may segment a baseband signal provided from the RF processor 1*k*-10, into OFDM symbol units, may reconstruct signals mapped to subcarriers by performing fast Fourier transformation (FFT) calculation, and then may reconstruct a received bit string by demodulating and decoding the signals.

The baseband processor 1*k*-20 and the RF processor 1*k*-10 may transmit and receive signals in a manner described above. Accordingly, the baseband processor 1*k*-20 and the RF processor 1*k*-10 may also be referred to as a transmitter, a receiver, a transceiver, or a communicator. Furthermore, at least one of the baseband processor 1*k*-20 and the RF processor 1*k*-10 may include different communication modules to support different radio access technologies. Also, at least one of the baseband processor 1*k*-20 and the RF processor 1*k*-10 may include different communication modules to process signals of different frequency bands. For example, the different radio access technologies may include a wireless LAN (e.g., IEEE 802.11), a cellular network (e.g., LTE), or the like. The different frequency bands may include a super-high frequency (SHF) (e.g., 2.NRHz, NRhz) band and a millimeter wave (mmWave) (e.g., 60 GHz) band. The UE may transmit or receive signals to or from the BS by using the baseband processor 1*k*-20 and the RF processor 1*k*-10, and the signals may include control information and data.

The storage 1*k*-30 may store basic programs, application programs, and data, e.g., configuration information, for operations of the UE. In particular, the storage 1*k*-30 may store information associated with an access node that performs wireless communication by using a radio access technology. The storage 1*k*-30 may provide the stored data, in response to a request by the controller 1*k*-40.

The controller 1*k*-40 may control overall operations of the UE. For example, the controller 1*k*-40 transmits and receives signals via the baseband processor 1*k*-20 and the RF processor 1k-10. Also, the controller 1k-40 records and reads data on or from the storage 1k-40. To this end, the controller 1k-40 may include at least one processor. For example, the controller 1k-40 may include a communication processor (CP) for controlling communications and an application processor (AP) for controlling an upper layer such as an application program. Also, according to an embodiment of the present disclosure, the controller 1k-40 may include a multi-connection processor 1k-42 configured to process a process running in a multi-connection mode. Also, at least one configuration in the UE may be implemented as one chip.

Figure 1L:
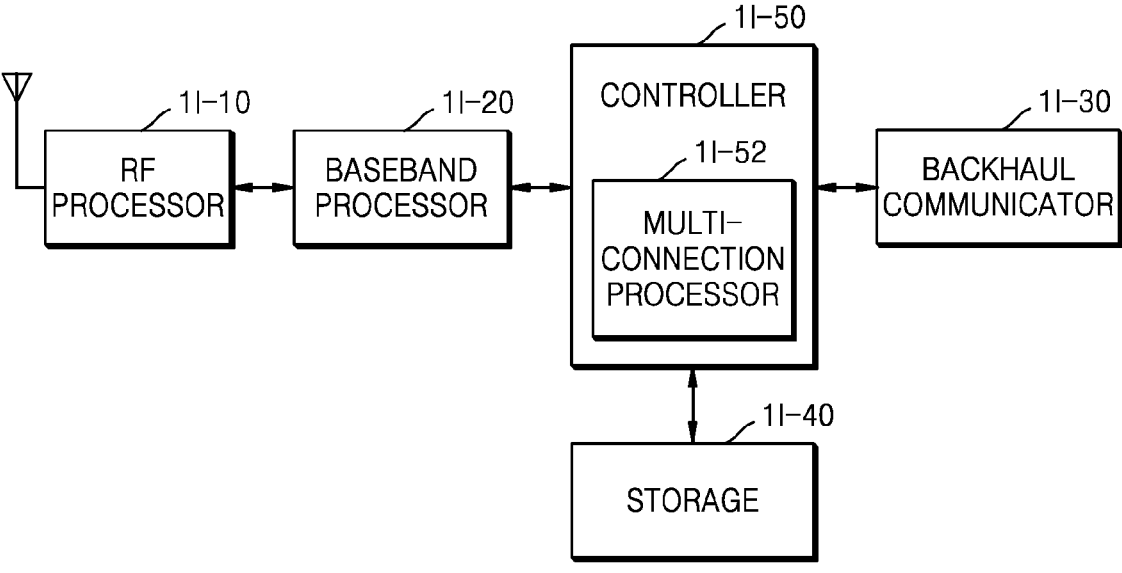
FIG. 1L is a block diagram illustrating a configuration of a base station according to an embodiment of the present disclosure.

FIG. 1L is a block diagram illustrating a configuration of a BS according to an embodiment of the present disclosure.

As illustrated in FIG. 1L, the BS includes an RF processor 1l-10, a baseband processor 1l-20, a backhaul communicator 1l-30, a storage 1l-40, and a controller 1l-50. However, the BS according to an embodiment is not limited to FIG. 1L, and may include fewer configurations or more configurations.

The RF processor 1l-10 may perform functions for transmitting and receiving signals via wireless channels, e.g., band conversion and amplification of the signals. That is, the RF processor 1l-10 may up-convert a baseband signal provided from the baseband processor 1l-20, into an RF band signal and then may transmit the RF band signal via an antenna, and may down-convert an RF band signal received via the antenna, into a baseband signal. For example, the RF processor 1l-10 may include a transmit filter, a receive filter, an amplifier, a mixer, an oscillator, a DAC, an ADC, or the like. Although only one antenna is illustrated in FIG. 1L, the RF processor 1l-10 may include a plurality of antennas.

Also, the RF processor 1l-10 may include a plurality of RF chains. Furthermore, the RF processor 1l-10 may perform beamforming. For the beamforming, the RF processor 1l-10 may adjust phases and intensities of respective signals that are transmitted or received via a plurality of antennas or antenna elements. The RF processor 1l-10 may perform a DL MIMO operation by transmitting one or more layers.

The baseband processor 1l-20 may perform conversion between a baseband signal and a bit string according to physical layer specifications of a radio access technology. For example, for data transmission, the baseband processor 1l-20 may generate complex symbols by encoding and modulating a transmit bit string. For data reception, the baseband processor 1l-20 may reconstruct a received bit string by demodulating and decoding a baseband signal provided from the RF processor 1l-10. For example, according to an OFDM scheme, for data transmission, the baseband processor 1l-20 may generate complex symbols by encoding and modulating a transmit bit string, may map the complex symbols to subcarriers, and then may configure OFDM symbols by performing IFFT and inserting a cyclic prefix (CP). For data reception, the baseband processor 1l-20 may segment a baseband signal provided from the RF processor 1l-10, into OFDM symbol units, may reconstruct signals mapped to subcarriers by performing FFT calculation, and then may reconstruct a received bit string by demodulating and decoding the signals. The baseband processor 1l-20 and the RF processor 1l-10 transmit and receive signals in a manner described above. Accordingly, the baseband processor 1l-20 and the RF processor 1l-10 may also be referred to as a transmitter, a receiver, a transceiver, a communicator, or a wireless communicator. The BS may transmit or receive signals to or from the UE by using the baseband processor 1l-20 and the RF processor 1l-10, and the signals may include control information and data.

The backhaul communicator 1l-30 may provide an interface for performing communication with other nodes in a network. That is, the backhaul communicator 1l-30 may convert a bit string into a physical signal, the bit string being transmitted from a primary BS to another node, e.g., an auxiliary BS, a core network, etc., and may convert a physical signal into a bit string, the physical signal being received from the other node.

The storage 1l-40 may store basic programs, application programs, and data, e.g., configuration information, for operations of the BS. In particular, the storage 1l-40 may store information about a bearer allocated to the accessing UE, a measurement result reported from the accessing UE, and the like. Also, the storage 1l-40 may store information that is a reference as to whether to provide or stop multi-connection to the UE. The storage 1l-40 may provide the stored data, in response to a request by the controller 1l-50. The storage 1l-40 may include any or a combination of storage media such as read only memory (ROM), random access memory (RAM), a hard disk, a compact disc (CD)-ROM, and a digital versatile disc (DVD). Also, the storage 1l-40 may be configured of a plurality of memories.

The controller 1l-50 may control overall operations of the BS. For example, the controller 1l-50 may transmit and receive signals via the baseband processor 1l-20 and the RF processor 1l-10 or the backhaul communicator 1l-30. Also, the controller 1l-50 may record and read data on or from the storage 1l-40. To this end, the controller 1l-50 may include at least one processor. Also, according to an embodiment of the present disclosure, the controller 1l-50 may include a multi-connection processor 1l-52 configured to process a process running in a multi-connection mode.

The methods according to the embodiments of the present disclosure as described herein or in the following claims may be implemented as hardware, software, or a combination of hardware and software.

When implemented as software, a computer-readable storage medium or a computer program product, which stores one or more programs (e.g., software modules), may be provided. The one or more programs stored in the computer-readable storage medium or the computer program product are configured for execution by one or more processors in an electronic device. The one or more programs include instructions directing the electronic device to execute the methods according to the embodiments of the present disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. Also, a plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the present disclosure. Furthermore, a separate storage device on the communication network may access the electronic device performing the embodiments of the present disclosure.

In the afore-described embodiments of the present disclosure, configuration elements included in the present disclosure are expressed in a singular or plural form according to the embodiments of the present disclosure. However, the singular or plural form is appropriately selected for convenience of descriptions and the present disclosure is not limited thereto. As such, a configuration element expressed in a plural form may also be configured as a single element, and a configuration element expressed in a singular form may also be configured as plural elements.

The embodiments of the present disclosure described with reference to the present specification and the drawings are merely illustrative of specific examples to easily facilitate description and understanding of the present disclosure, and are not intended to limit the scope of the present disclosure. That is, it will be understood by one of ordinary skill in the art that other modifications based on the technical ideas of the present disclosure are feasible. Also, the embodiments may be combined to be implemented, when required. For example, portions of an embodiment of the present disclosure may be combined with portions of another embodiment of the present disclosure. Also, modifications based on the technical scope of the embodiments may be applied to other systems such as an LTE system, a 5G or NR system, or the like.

The invention claimed is:

1. A method performed by a user equipment (UE) in a wireless communication system, the method comprising:
    receiving, from a base station (BS), configuration information associated with a logged minimization of driving test (MDT), the configuration information including logging interval information and event type information;
    performing first measurement logging based on the configuration information while in an idle state or an inactive state;
    determining whether reportType is set to periodical or eventTriggered;
    when the reportType is set to eventTriggered, determining whether an in-device coexistence (IDC) problem is detected; and
    when the IDC problem is detected, including InDeviceCoexDetected in a report and performing second measurement logging based on the logging interval information while in the idle state or the inactive state.

2. The method of claim 1, further comprising, when UE transitions to a connected state, transmitting, to a BS, the report including the InDeviceCoexDetected and logged measurement information.

3. The method of claim 1, wherein the event type information indicates out of coverage (OOC) or eventL1.

4. The method of claim 1, wherein an event condition configured by the event type information is not met.

5. The method of claim 1, further comprising: receiving a connection release message in a connected state,
    wherein the UE transitions to the idle state or the inactive state, based on the connection release message.

6. The method of claim 1, wherein the first measurement logging is performed while a timer is running.

7. A user equipment (UE) in a wireless communication system, the UE comprising:

at least one transceiver;
    at least one processor communicatively coupled to the at least one transceiver; and
    at least one memory, communicatively coupled to the at least one processor, storing instructions executable by the at least one processor to cause the UE to:
        receive, from a base station (BS), configuration information associated with a logged minimization of driving test (MDT), the configuration information including logging interval information and event type information;
        perform first measurement logging based on the configuration information while in an idle state or an inactive state,
    determine whether reportType is set to periodical or eventTriggered;
        when the reportType is set to eventTriggered, determine whether an in-device coexistence (IDC) problem is detected; and
        when the IDC problem is detected, including InDeviceCoexDetected in a report and perform second measurement logging based on the logging interval information while in the idle state or the inactive state.

8. The UE of claim 7, wherein the UE is further caused to, when the UE transitions to a connected state, transmit, to a BS, the report including the InDeviceCoexDetected and logged measurement information.

9. The UE of claim 7, wherein the event type information indicates out of coverage (OOC) or eventL1.

10. The UE of claim 7, an event condition configured by the event type information is not met.

11. The UE of claim 7, wherein
    the UE is further caused to receive a connection release message in a connected state, and
    wherein the UE transitions to the idle state or the inactive state, based on the connection release message.

12. One or more non-transitory computer-readable storage media storing computer-executable instructions, when executed by at least one processor of a user equipment (UE), cause the UE to perform operations, the operations comprising:
    receiving, from a base station (BS), configuration information associated with a logged minimization of driving test (MDT), the configuration information including logging interval information and event type information;
    performing first measurement logging based on the configuration information while in an idle state or an inactive state;
    determining whether reportType is set to periodical or eventTriggered;
    when the reportType is set to eventTriggered, determining whether an in-device coexistence (IDC) problem is detected; and
    when the IDC problem is detected, including InDeviceCoexDetected in a report and performing second measurement logging based on the logging interval information while in the idle state or the inactive state.

* * * * *